US012756564B2

(12) United States Patent
Brien et al.

(10) Patent No.: US 12,756,564 B2
(45) Date of Patent: Oct. 6, 2026

(54) REPUTATION TOKENS BASED ON USER ACTIVITIES IN VIRTUAL WORLDS

(71) Applicant: Comcast Cable Communications, LLC, Philadelphia, PA (US)

(72) Inventors: Sean Brien, Robbinsville, NJ (US); Charles Helfinstine, Wynnewood, PA (US); Janardhan Bollineni, King of Prussia, PA (US); Aaron Newberry, Littleton, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 121 days.

(21) Appl. No.: 18/151,841

(22) Filed: Jan. 9, 2023

(65) Prior Publication Data

US 2024/0235836 A1 Jul. 11, 2024

(51) Int. Cl.

| | |
|---|---|
| ***H04L 9/00*** | (2022.01) |
| ***G06F 21/62*** | (2013.01) |
| ***H04L 9/32*** | (2006.01) |
| ***H04L 29/06*** | (2006.01) |

(52) U.S. Cl.

CPC ............ *H04L 9/3213* (2013.01); *G06F 21/62* (2013.01)

(58) Field of Classification Search

CPC ............................... G06F 21/62; H04L 9/3213

USPC ............................................................. 726/9

See application file for complete search history.

(56) References Cited

U.S. PATENT DOCUMENTS

| | | | | |
|---|---|---|---|---|
| 11,030,297 | B2 * | 6/2021 | Antar | H04L 9/0861 |
| 11,801,448 | B1 * | 10/2023 | Zatkin | A63F 13/792 |
| 2013/0047217 | A1 * | 2/2013 | Shuster | G06F 40/143 726/4 |
| 2013/0225267 | A1 * | 8/2013 | Koch | A63F 13/798 463/25 |
| 2017/0148267 | A1 * | 5/2017 | Parker | G07F 17/323 |
| 2019/0192977 | A1 * | 6/2019 | Eatedali | A63F 13/35 |
| 2020/0153827 | A1 * | 5/2020 | Moen | H04L 63/1441 |
| 2021/0319083 | A1 * | 10/2021 | Bernardi | H04L 51/10 |
| 2022/0051180 | A1 * | 2/2022 | Altieri | G06Q 10/087 |
| 2023/0108817 | A1 * | 4/2023 | Vosseller | G06Q 20/405 705/26.3 |
| 2023/0201715 | A1 * | 6/2023 | Wang | H04N 21/4781 463/31 |

(Continued)

FOREIGN PATENT DOCUMENTS

| | | | | |
|---|---|---|---|---|
| CA | 2763284 C | * | 3/2020 | G07F 17/3244 |
| CN | 105474166 A | * | 4/2016 | G06F 16/245 |

(Continued)

*Primary Examiner* — Haresh N Patel

(74) *Attorney, Agent, or Firm* — Banner & Witcoff, Ltd.

(57) ABSTRACT

Systems, apparatuses, and methods are described for enabling user access to one or more virtual worlds and/or the user activities in the virtual worlds by use of reputation tokens. Data associated with the virtual worlds, user devices, allowed, promoted, and prohibited activities performed in the virtual worlds by the user devices, and/or other data may be stored in one or more blockchain networks, and a user may be associated with a quantity of reputation tokens based on that user's activities in the virtual world. A user may be permitted to access, communicate, interact, and transact in a virtual world based on the quantity of reputation tokens of the user satisfying a required quantity of reputation tokens.

21 Claims, 22 Drawing Sheets

(56) References Cited

U.S. PATENT DOCUMENTS

| | | | | |
|---|---|---|---|---|
| 2023/0316320 | A1 * | 10/2023 | Yamazaki | G06Q 30/0224 705/14.25 |
| 2024/0112409 | A1 * | 4/2024 | Cross | G06T 19/006 |
| 2024/0169037 | A1 * | 5/2024 | Dravneek | G06F 21/31 |

FOREIGN PATENT DOCUMENTS

| | | | | | |
|---|---|---|---|---|---|
| CN | 114881696 | A | * | 8/2022 | G06F 16/2379 |
| JP | 2021517292 | A | * | 7/2021 | |
| WO | WO-2018200315 | A1 | * | 11/2018 | G02B 27/017 |
| WO | WO-2022162430 | A1 | * | 8/2022 | |

* cited by examiner

800

| User Blockchain Address (802) | Reputation Account Object Identifier (804) | Timestamp (806) | Transaction (808) |
|---|---|---|---|
| ########## | ####### | 2017-09-12T22:56:33 | +650 Reputation Token |

830

| Virtual World Object Identifier (832) | Reputation Account Object Identifier (804) | User Account Object Identifier (816) | Access Timestamp (834) |
|---|---|---|---|
| ######## | ######## | ######## | 2022-07-12T20:56:33 |

840

| Virtual World Object Identifier (832) | Reputation Account Object Identifier (804) | User Account Object Identifier (816) | User Activity Data (842) |
|---|---|---|---|
| ######## | ######## | ######## | |

FIG. 8C

850

| Virtual World Object Identifier (812) | Reputation Account Object Identifier (804) | User Account Object Identifier (816) | Exit Timestamp (852) |
|---|---|---|---|
| ######## | ######## | ######## | 2022-07-14T22:56:33 |

FIG. 8D

860

| Blockchain Address of Prohibited Activity Evaluator (861) | Timestamp (806) | Transaction (862) |
|---|---|---|
| K6JVXGY2WY | 2033-09-12T22:56:33 | +50 Fungible Tokens |

FIG. 8E

| User Blockchain Address (802) | Reputation Account Object Identifier (804) | Timestamp (806) | Transaction (868) |
|---|---|---|---|
| ########## | ####### | 2017-09-12T22:56:33 | -10 Reputation Tokens |

REPUTATION TOKENS BASED ON USER ACTIVITIES IN VIRTUAL WORLDS

BACKGROUND

Virtual worlds may be computer-based or computer-simulated environments where users participate in different activities and communicate, interact, and/or share content or resources with other users. A value exchange system, such as a digital currency exchange system (e.g., cryptocurrency exchange system), may be used to enable exchange of information or objects, or purchase of products, services, or objects. User activities and/or communications in such virtual worlds may or may not be regulated, but currently available digital currency systems may not be well suited for regulating user activities and/or communications in the virtual worlds. This disclosure addresses these and other concerns.

SUMMARY

The following summary presents a simplified summary of certain features. The summary is not an extensive overview and is not intended to identify key or critical elements.

Systems, apparatuses, and methods are described for enabling access of a user, via a user device, to a virtual world such that the user may perform activities in the virtual world. Activities such as social and/or commercial interactions may be based on rules about virtual world access. Such rules may be based on activities enabled, allowed and/or regulated by the virtual world. Such rules may be provided by the virtual world and stored in one or more networks that may use blockchain technologies or other ledgers that are secure and accessible. The virtual world may require that a user be associated with at least a threshold quantity of reputation tokens for that user to access that virtual world, and thereafter perform social or commercial interactions in the virtual world. Such reputation tokens may be determined based on the activities and/or interactions of the user in that virtual world and/or other virtual worlds. The reputation tokens may differ from fungible tokens (e.g., cryptocurrencies used for financial transactions) and/or non-fungible tokens (e.g., digital assets that represent real-world objects such as art, music, videos, etc.) associated with the user. The blockchain networks may be used to record information about the virtual world, the user, one or more user devices associated with the user, activities and/or interactions of the user in the virtual world and/or other virtual worlds, and/or quantities of reputation tokens associated with the user. Blockchain transactions may be executed to transfer reputation tokens to the user based on the time spent by the user in the virtual world. In addition, blockchain transactions may be executed to penalize the user if it is determined that the user has performed a prohibited activity in the virtual world.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 7 shows an example user interface displaying virtual worlds available for access.

FIGS. 8A, 8B, 8C, 8D, 8E, 8F, and 8G show example blockchain transactions stored in one or more blockchain networks.

DETAILED DESCRIPTION

Figure 1:
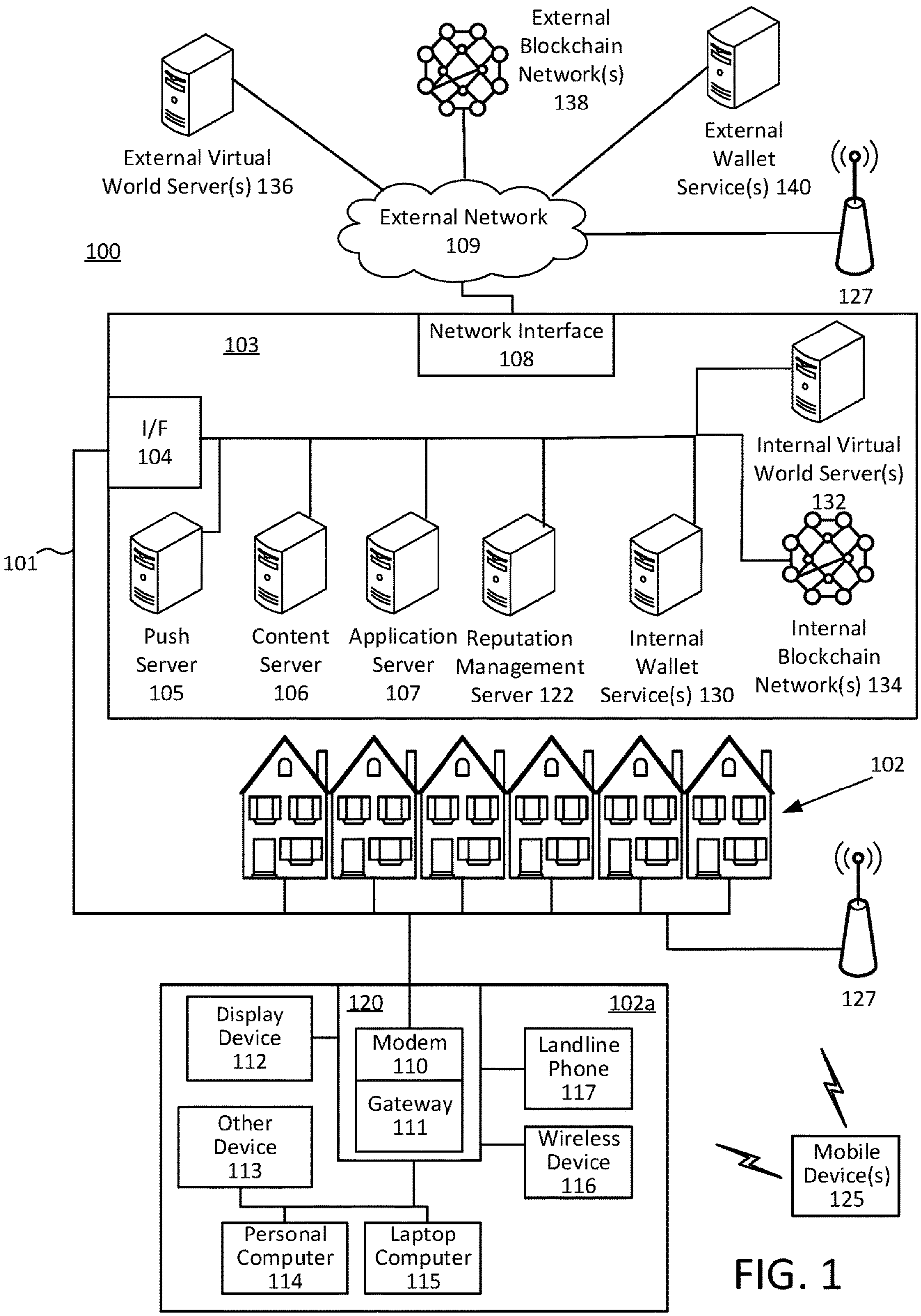
FIG. 1 shows an example communication network providing reputation-based access to virtual worlds.

The accompanying drawings, which form a part hereof, show examples of the disclosure. It is to be understood that the examples shown in the drawings and/or discussed herein are non-exclusive and that there are other examples of how the disclosure may be practiced.

A virtual world (e.g., a digital world) may comprise a virtual (e.g., digital) environment (e.g., computer-simulated or computer-based environment) in which multiple users traverse within the virtual environment and/or perform various activities, such as interacting with other users, playing video games with other users, sharing content with other users, viewing content created by other users, and/or building, buying, or selling virtual real and/or digital properties. Examples of such virtual worlds may include online games, massively multiplayer online games, virtual workout platforms, virtual travel platforms, social media platforms, websites, e-commerce platforms, virtual learning environments, forums, blogs, chatrooms, instant messaging, video conferences, collaborative virtual environments, and/or other types of virtual environment that enables users to perform online activities. The virtual world may be simulated as two or three-dimensional environments constructed from computer instructions or code, graphics, video, text, music, and other content. The virtual world may for example, represent the real world, a fictitious world, a gaming world, and/or one or more communities. A virtual world may be hosted and/or maintained by one or more virtual world servers. A user may create and/or use a user account (e.g., an identity or an avatar) representing the user in the virtual worlds. This user account may be associated with any interactions the user may have with other users or users' accounts, and/or any activities or behaviors of the user in the virtual worlds. Users may access (e.g., login to) a virtual world from different physical locations and/or via different user devices. User devices may for example, comprise mobile devices such as the mobile devices 125 described below, one or more of the devices in the premises 102*a* described below, and/or other computing devices (e.g., computers, tablets, laptops, smartphones, smart-TV, virtual reality headsets, augmented reality headsets, set-top boxes, etc.).

A user in a virtual world may affect the experience of other users in that same world by inappropriately interacting with the other users (e.g., bullying, lying, harassing, destroying or mishandling virtual properties of other users, assaults, etc.), creating inappropriate content for the other users (e.g., content with false information, violent or offensive content, etc.), improperly responding to activities, behaviors, and/or content of the other users (e.g., cursing, trolling, attacking avatars of other users, etc.), committing illegal acts (e.g., credit fraud, identity fraud, theft of private data or corporate data, hacking, etc.) and/or other activities. Furthermore, if such improper, inappropriate, or illegal activities by the user are not regulated, the other users may get frustrated with the unsafe or unfriendly environment in the virtual world and decide not to participate in activities in the virtual world anymore. Thus, it is desirable to provide a method of regulating user activities in virtual worlds to maintain a safe and congenial environment and/or limit virtual world accesses of users prone to inappropriate and/or illegal behaviors.

Technology described herein may use reputation tokens owned by and/or associated with a user to represent a user's behavior in the virtual worlds. The reputation tokens may be based on a user behaving properly or positively in the virtual worlds. Such proper and/or positive behavior may include appropriately interacting with the other users, creating appropriate content, properly responding to activities, behaviors, and/or content of the other users, not committing illegal acts and/or other proper or positive activities. The reputation tokens may also be based on, or be affected by proneness to inappropriate, improper, and/or illegal behaviors and limit the user's access to a virtual world if the user is prone to such behaviors. Virtual worlds may use reputation tokens of users to evaluate the potential risk posed by granting the users access to the virtual worlds and/or determine which users qualify for access to the virtual worlds. For example, a particular virtual world may require that a user owns and/or is associated with at least a threshold amount of reputation tokens to gain access to that virtual world. Virtual worlds may also use reputation tokens to determine which users are prone to behaving appropriately in the virtual worlds and/or which users are prone to perform inappropriate or illegal activities. For example, users with less than 500 reputation tokens may be extremely prone to inappropriate or illegal user activities, users with 501 to 600 reputation tokens may be moderately prone to inappropriate or illegal user activities, users with 601 to 800 reputation tokens may be prone to behave appropriately most of the time, and users with more than 801 reputation tokens may be considered model users. A strict virtual world may only grant access to users with more than 800 reputation tokens, while a less strict virtual world may allow users with more than 600 reputation tokens. A new user who has never accessed a virtual world may initially be provided with a predetermined number of reputation tokens, such as 600 reputation tokens or 550 reputation tokens. Therefore, while the new user may be able to access the less strict virtual world requiring 600 reputation tokens for access, the stricter virtual world requiring 900 reputation tokens may be off-limits until the user owns or is associated with more than 800 reputation tokens.

A user's activities in one or more virtual worlds may determine reputation tokens gained or lost by the user. Reputation tokens may be awarded or transferred to users for time spent in the virtual worlds performing appropriate and/or positive activities. For example, one reputation token may be transferred to a user if the user has spent twenty hours in a virtual world. Transferring reputation tokens to the user may also be based on determining that the user has not performed any inappropriate or illegal activities during that time. Conversely, reputation tokens may be taken away from users for committing inappropriate or illegal activities.

Additionally, a virtual world may maintain one or more rulebooks comprising rules for prohibited activities (e.g., inappropriate and/or illegal activities) in the virtual world and quantities of reputation tokens to be penalized for such prohibited activities. For example, a rulebook of a massively multiplayer online game may indicate that penalizing a user for five reputation tokens may apply when the user uses expletive language when communicating with other users in the massively multiplayer online game. Additionally, the rulebook may indicate that penalizing a user for fifty reputation tokens may apply when the user destroys the virtual property of another user in the massively multiplayer online game. The rulebooks may also comprise rules for appropriate and/or positive activities, for which reputation tokens may be awarded to the user. For example, the rulebook may indicate that twenty reputation tokens may be awarded to a user if the user stops two other users from fighting, or fifty reputation tokens may be awarded to the user if the user protects a virtual property from being destructed by another user.

New rules may be added to the rulebook, existing rules may be canceled or modified, and/or exceptions to existing rules may be added by votes by major stakeholders of the virtual world. Major stakeholders may comprise, without limitation, investors, owners, employees, founders, shareholders, and/or members of a governing board of a company, organization, or other entity that maintains (or is otherwise associated with) a virtual world, users of the virtual world, and/or anyone the virtual world has designated as stakeholders.

Reputation tokens may differ from some types of fungible tokens (e.g., cryptocurrency or digital currencies). For example, some fungible tokens may be a form of currency that exists digitally or virtually and may be used as a medium of exchange in financial transactions between multiple users. Fungible tokens may use cryptography to prevent counterfeiting, double spending, and/or fraud. Example fungible tokens used as cryptocurrency may comprise BITCOIN, ETHEREUM, BITCOIN CASH, RIPPLE, LITECOIN, CARDANO, DOGECOIN, XRP, etc.

Transactions of fungible tokens between users, parties, and/or organizations may be stored as blockchain transactions in one or more blockchain networks. A blockchain network may be a decentralized and distributed system that hosts distributed ledgers and/or blockchains among a network of computer nodes (e.g., computing devices). The distributed ledgers and/or blockchains may be replicated among the computer nodes and store executed blockchain transactions and/or other data. A blockchain transaction may encode a transfer of control of a quantity of fungible tokens between two or more users.

Similar to fungible tokens, transactions of reputation tokens transferred to or from users may also be stored as blockchain transactions in one or more blockchain networks. In addition, cryptography may be used to secure blockchain transactions of reputation tokens to prevent fraudulent gains of reputation tokens by users with low quantities of reputation tokens.

Additionally, reputation tokens may also be different from non-fungible tokens. A non-fungible may be a digital token representing ownership of a unique physical or digital item, such as a copyrighted work, art, real estate, music, or video. The non-fungible token may function as a proof of ownership of the physical or digital item, for example, in authenticating ownership of the physical or digital item. Non-fungible tokens may be stored in distributed ledgers and/or blockchains in one or more blockchain networks. A blockchain transaction may be executed to transfer the ownership of the non-fungible token.

Accessing a virtual world may comprise logging in, entering, and/or starting to view, interact, or communicate in a two-dimensional virtual environment of the virtual world (e.g., via a website, a page, or an app of a two-dimensional video game, a social media platform, an e-commerce platform, a forum, a blog, a chatroom, or an instant messaging application, video conferences, learning platform, etc.). Additionally, or alternatively, accessing a virtual world may comprise logging in, entering, and/or starting to view, interact, or communicate in a three-dimensional virtual environment of the virtual world (e.g., a three-dimensional virtual environment of a massively multiplayer online game, a virtual workout platform, a virtual travel platform, a virtual learning environment, etc.).

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein. The communication network 100 may enable the devices (e.g., user devices, networking devices) in premises 102 to communicate with other devices in the premises 102, devices outside the premises 102 (e.g., the external virtual worlds 136, the external blockchain networks 138, and/or the external wallet services 140), and/or devices inside the local office 103 (e.g., the push server 105, the content server 106, the app server 107, the reputation management server 122, the internal wallet services 130, the internal blockchain network 134, and/or the internal virtual worlds 132).

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as devices 105, 106, 107, 122, 130, 132, 134, and/or to manage communications between those devices and one or more external networks 109. The interface 104 may for example, comprise one or more routers, one or more base stations, one or more optical line terminals (OLTs), one or more termination systems (e.g., a modular cable modem termination system (M-CMTS), or an integrated cable modem termination system (I-CMTS)), one or more digital subscriber line access modules (DSLAMs), and/or any other computing device(s).

The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

One or more internal virtual world server(s) 132 (which may be part of the local office 103 or in communication with the local office 103) may be configured to provide virtual or computer-simulated environments to users of the devices in the premises 102 and/or to users of the mobile devices 125. Examples of such virtual or computer-simulated environments may include online games, video games, massively multiplayer online games, virtual workout platforms, virtual travel platforms, social media platforms, websites, e-commerce platforms, virtual learning environments, forums, blogs, chatrooms, instant messaging, video conferences, collaborative virtual environments, etc. In addition, the internal virtual world server(s) 132 may be configured to store digital resources (e.g., blogs, posts, webpages, virtual scenes, virtual environment, etc.) in different forms (e.g., graphics, video, text, and/or other representations) and use the stored digital resources to create two or three-dimensional virtual or computer-simulated environments. The virtual or computer-simulated environments in the internal virtual world servers 132 may be accessed by various users in the premises 102 via the devices in the premises 102 and the communication link 101. Additionally, users of the mobile devices 125 may access the internal virtual world servers 132 via the access points 127. Users of devices in the premises 102 and/or the mobile devices 125 may explore the virtual or computer-simulated environments, interact with other users, share content or other digital resources, and/or build, buy, or sell real and/or digital properties in the internal virtual world server(s) 132. In addition, the internal virtual world server(s) 132 may comprise software to validate user accounts, identities, and entitlements, locate and retrieve requested digital resources (e.g., blogs, posts, webpages, virtual scenes, virtual environment, etc.), and/or initiate delivery (e.g., streaming) of the requested digital resources.

Additionally, or alternatively, one or more external virtual world server(s) 136 may be accessible by users of devices in the premises 102 and/or the mobile devices 125 via the external network 109. The external virtual world server(s) 136 may be configured to communicate with the devices 105, 106, 107, 122, 130, 132, 134, in the local office 103 and/or with computing devices located in or otherwise associated with one or more premises 102. The external virtual world server(s) 136 may be similar to the internal virtual world server(s) 132. For example, the external virtual world server(s) 136 may also store digital resources that may be used to create two or three-dimensional virtual or computer-simulated environments that may be accessed by devices in the premises 102 and/or the mobile devices 125.

Devices in the premises 102 and/or the mobile devices 125 may comprise software applications (also referred to as an "app") to access the virtual or computer-simulated environments in the internal virtual world server(s) 132 and/or the external virtual world server(s) 136. The internal virtual world server(s) 132 and/or the external virtual world server (s) 136 may send the requested environments and/or digital resources to the applications. Applications may cause display and/or output of the requested environments and/or digital resources to users of the devices in the premises 102 and/or to the mobile devices 125. In addition, the applications may comprise software to validate user accounts, identities, and entitlements, locate and retrieve requested digital resources (e.g., blogs, posts, webpages, virtual scenes, virtual environment, etc.), and/or initiate delivery (e.g., streaming) of the requested digital resources. The devices in the premises 102 and/or the mobile devices 135 may download the applications from an application server 107 or one or more other application servers located outside the local office 103. The application server 107 may be a server that provides various applications for downloading. Additionally, or alternatively, devices in the premises 102 and/or the mobile devices 125 may access the virtual or computer-simulated environments in the internal virtual world server(s) 132 and/or the external virtual world server (s) 136 via one or more websites and without the aid of any downloaded applications.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The content server 106 may be configured to offer any desired service. For example, the content server 106 may be responsible for collecting, and generating a download of, information for electronic program guide listings. Another content server may be responsible for monitoring user viewing habits and collecting information from that monitoring for use in selecting advertisements. Yet another content server may be responsible for formatting and inserting advertisements in a video stream being transmitted to devices in the premises 102 and/or to the mobile devices 125, and/or formatting and inserting advertisements in virtual environments accessed by the devices in the premises 102 and/or the mobile devices 125. The local office 103 may comprise additional servers, such as the reputation management server 122 (described below), additional push, content, and/or application servers, and/or other types of servers. Although shown separately, the push server 105, the content server 106, the application server 107, the reputation server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102*a* may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 120 may be connected to, or be a part of, the gateway 111. The gateway 111 may be a computing device that communicates with the modem(s) 110 to allow one or more other devices in the premises 102*a* to communicate with the local office 103 and/or with other devices beyond the local office 103 (e.g., via the local office 103 and the external network(s) 109). The gateway 111 may comprise a set-top box (STB), a digital video recorder (DVR), a digital transport adapter (DTA), a computer server, and/or any other desired computing device.

The gateway 111 may also comprise one or more local network interfaces to communicate, via one or more local networks, with devices in the premises 102*a*. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102*a* may represent wired or wireless connections, as may be appropriate for the type of local network used. One or more of the devices at the premises 102*a* may be configured to provide wireless communications channels (e.g., IEEE 802.11 channels) to communicate with one or more of the mobile devices 125, which may be on- or off-premises.

The reputation management server 122 may be configured to regulate, by use of reputation tokens, requests from users of the mobile devices 125, the devices in the premises 102*a*, and/or other devices to access the virtual worlds (e.g., virtual worlds maintained by the internal virtual world servers 132 and/or the external virtual world servers 136). A virtual world (e.g., a virtual world maintained by either the internal virtual world servers 132 or the external virtual world servers 136) may provide, to the reputation server 122, rules for accessing the virtual world. For example, the virtual world may specify a threshold quantity of reputation tokens devices need to own and/or be otherwise associated with to enter, access, and/or log in to the virtual world. The reputation management server 122 may be configured to receive a request from a user via the user device associated with the user to access the virtual world and determine whether the user is associated with enough reputation tokens to grant the request. The reputation management server 122 may also be configured to receive, from a virtual world, rules regarding how many reputation tokens to transfer to a user for time spent by the user in the virtual world. In addition, the reputation management server 122 may be configured to receive, from the virtual world, rules indicating prohibited activities in the virtual world (e.g., rules regarding spreading false information, destroying virtual properties of other users, attacking, harassing, trolling, etc.) and/or penalties for performing such prohibited activities.

The reputation management server 122 may be in communications with one or more internal blockchain network (s) 134 (which may be part of the local office 103 or in communication with the local office 103) and/or one or more external virtual world server(s) 136 (accessible by the reputation management server 122 via the external network 109). A blockchain network of the internal blockchain network(s) 134 and/or the external blockchain networks 138 may include a decentralized and distributed system comprising a plurality of nodes (e.g., computing devices, such as the computing device described in FIG. 2), where each node may independently maintain a copy of the same blockchain ledger or blockchain. The blockchain ledger or blockchain may be a data structure comprising multiple blocks of data storing transactions, records, data structures, and/or information pertinent to the virtual worlds of the internal virtual world servers 132, the virtual worlds of the external virtual world servers 136, the mobile devices 125, the devices in the premises 102, the internal digital wallet services 130, and the external digital wallet services 140. Additionally, the blockchain ledger or blockchain of a blockchain network may also store information pertinent to the blockchain network (e.g., header, nonce, token balances, storage root, code hash, signature, ommers hash, beneficiary, state root, transactions root, receipts root, logs bloom, public key, extra data, and/or mix hashes).

Some of the nodes in a blockchain network (e.g., internal blockchain network(s) 134 and/or the external blockchain networks 138) may be referred to as mining modes (also referred to as miners, stakers, or validators). The mining nodes may perform the mining operations in the blockchain network as well as maintain a copy of the blockchain or the blockchain ledger. Mining operations may include validating new transactions, records, data structures, and data blocks, creating new blocks in the blockchain with the validated transactions, records, data structures, and data blocks, validating the new blocks, and/or sending the validated new blocks to other nodes in the blockchain network. Nodes of blockchain networks that are not mining nodes may maintain copies of the blockchain without performing any mining operations. The mining nodes in a blockchain network may actively protect the blockchain network by maintaining a consensus algorithm. The miners may reach a consensus on the validations of new blocks before adding the new blocks to the blockchain. After reaching a consensus, the new blocks may be broadcasted to the entire network of nodes in the blockchain network. While each mining node in the blockchain network can create its own block, only the block with a consensus is accepted to be added to the blockchain. The consensus mechanism ensures that the mining nodes agree on the same block to be added to the blockchain. Blockchain networks may offer enhanced security compared to centralized systems (e.g., systems where data is stored in only one node or computing device) as multiple miners verify the data stored in the blockchain. In addition to the stored data, each block contains a consensus proof of itself and the consensus proof of the previous block. Any attempts to modify a transaction may change the consensus proof and require all the subsequent blocks to be recomputed. This would be extremely difficult to achieve as long as the majority of mining nodes do not cooperate to attack the network. Various consensus algorithms may be used to determine the consensus proofs of new blocks, such as Proof of Work (PoW), Proof of Stake (PoS), Delegated Proof of Stake (DPoS), Transaction as Proof of Stake (TaPoS), Delegated Byzantine Fault Tolerance (dBFT), Proof of Importance (PoI), and/or Proof of Elapsed Time (PoET).

The reputation management server 122 may store data about virtual worlds (e.g., the virtual worlds maintained by the internal virtual world servers 132 and/or the external virtual world servers 136) in the internal blockchain network (s) 134 and/or the external blockchain network(s) 138. For example, the data may include rules for accessing the virtual worlds (e.g., whether reputation tokens are needed to enter, access, or log in to a virtual world, the quantity of reputation tokens needed), rules about prohibited activities in the virtual world, and/or penalties for such prohibited activities.

Users of devices in the premises 102 and/or the mobile devices 125 may create one or more user accounts with the internal virtual world server(s) 132 and/or the external virtual world server(s) 136. The account information for each created user account may be maintained or stored in the internal blockchain network(s) 134 and/or the eternal blockchain networks 138. Account information may include a unique account identifier identifying the user account, personal information of the users, username and password needed to access the virtual worlds, email address, home address, credit card information, banking information, etc.

Additionally, users of the devices in the premises 102 and/or the mobile devices 125 may create one or more reputation accounts with the reputation management server 122. One reputation account may be linked to multiple user accounts for the same virtual world and/or for different virtual worlds. Information about the reputation accounts may be maintained or stored in the internal blockchain network(s) 134 and/or the external blockchain networks 138. Information about the reputation accounts may include a unique account identifier identifying the reputation account, a quantity or balance of reputation tokens associated with the user, a quantity or balance of fungible tokens associated with the user, personal information of the users, email address, home address, credit card information, banking information, etc.

The reputation management server 122 may execute blockchain transactions to transfer reputation tokens to a user and/or transfer reputation tokens away from the user. Such blockchain transactions may be stored in the internal blockchain network(s) 134 and/or the external blockchain networks 138. The blockchain transaction can be associated with a blockchain address (e.g., a cryptographic address) unique to the user and/or a user device of the user. A blockchain address of a user or a user device may be generated using a pair of keys: (i) a public key, which may be disseminated widely, and (ii) a private key, which may be known only to the user or the user device. The public key of the user or the user device is used to identify transactions associated with the blockchain address of the user and/or the user device, while the private key is used to encrypt or decrypt the blockchain transactions.

The public and/or private keys of the reputation management server 122, the device in the premises 102, the mobile devices 125, and/or virtual worlds maintained by the internal virtual world server(s) 132 and/or the external virtual world server(s) 136 may be stored in the internal blockchain network(s) 134 and/or the external blockchain networks 138, may be stored in a digital wallet, such as the internal digital wallet services 130 (which may be part of the local office 103 or in communication with the local office 103) and/or the external digital wallet services 140 (accessible via the external network 109). A digital wallet service (e.g., the internal digital wallet services 130, the external digital wallet services 140) may comprise a server that executes one or more software programs that maintain blockchain addresses and public and/or private keys held by users or user devices and support the execution of blockchain transactions by which users or user devices may send or receive reputation tokens, fungible tokens, and/or non-fungible tokens. Example digital wallet services may include Coinbase, Bread Wallet, Mycelium, Exodus, Copay, Jaxx, Armory, Trezor, Ledger Nano, Green Address, Blockchain.info, and/or other digital wallet services. A digital wallet service (e.g., the internal wallet services 130, the external wallet services 140) may comprise a user interface. The user interface may comprise control commands indicative of requests to execute blockchain transactions of reputation tokens, fungible tokens, and/or non-fungible tokens. The user interface may allow a user, a user device, a virtual world server (e.g., the internal virtual world servers 132, the external virtual world servers 136), and/or the reputation management server 122 to inquire about a user's balances of reputation tokens, and/or fungible tokens.

Figure 2:
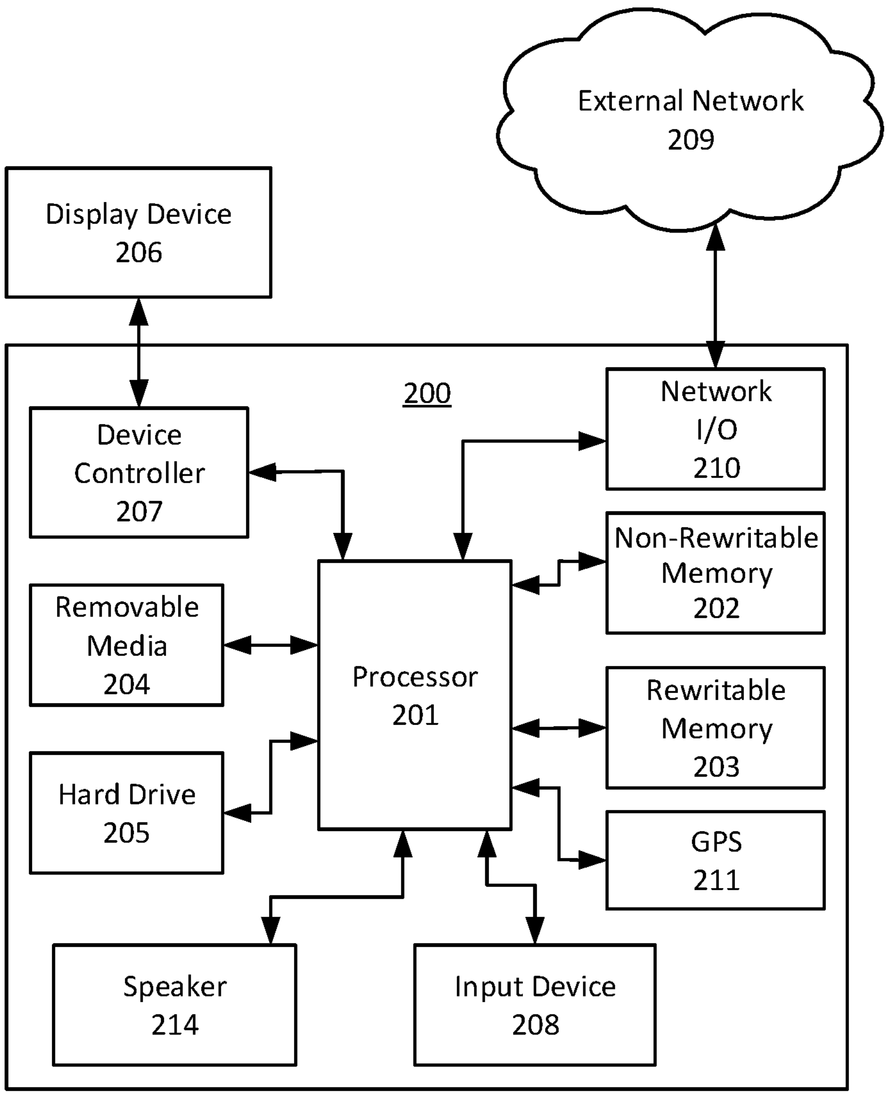
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102*a*, any of the devices shown in the local office 103, any of the wireless access points 127, the external virtual world servers 136, any of the nodes of the external blockchain networks 138, the external wallet services 140) and any other computing devices discussed herein (e.g., the reputation management server 300, computing devices and/or blockchain nodes associated with prohibited activity evaluators, machine learning models, computing devices and/or blockchain nodes associated with stakeholders of a virtual world, etc.). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), a microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, and/or divide components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations, and other operations described herein. An IC may perform some operations based on execution of programming instructions read from ROM or RAM, with other operations hardwired into gates or other logic. Further, an IC may be configured to output image data to a display buffer.

Figure 3:
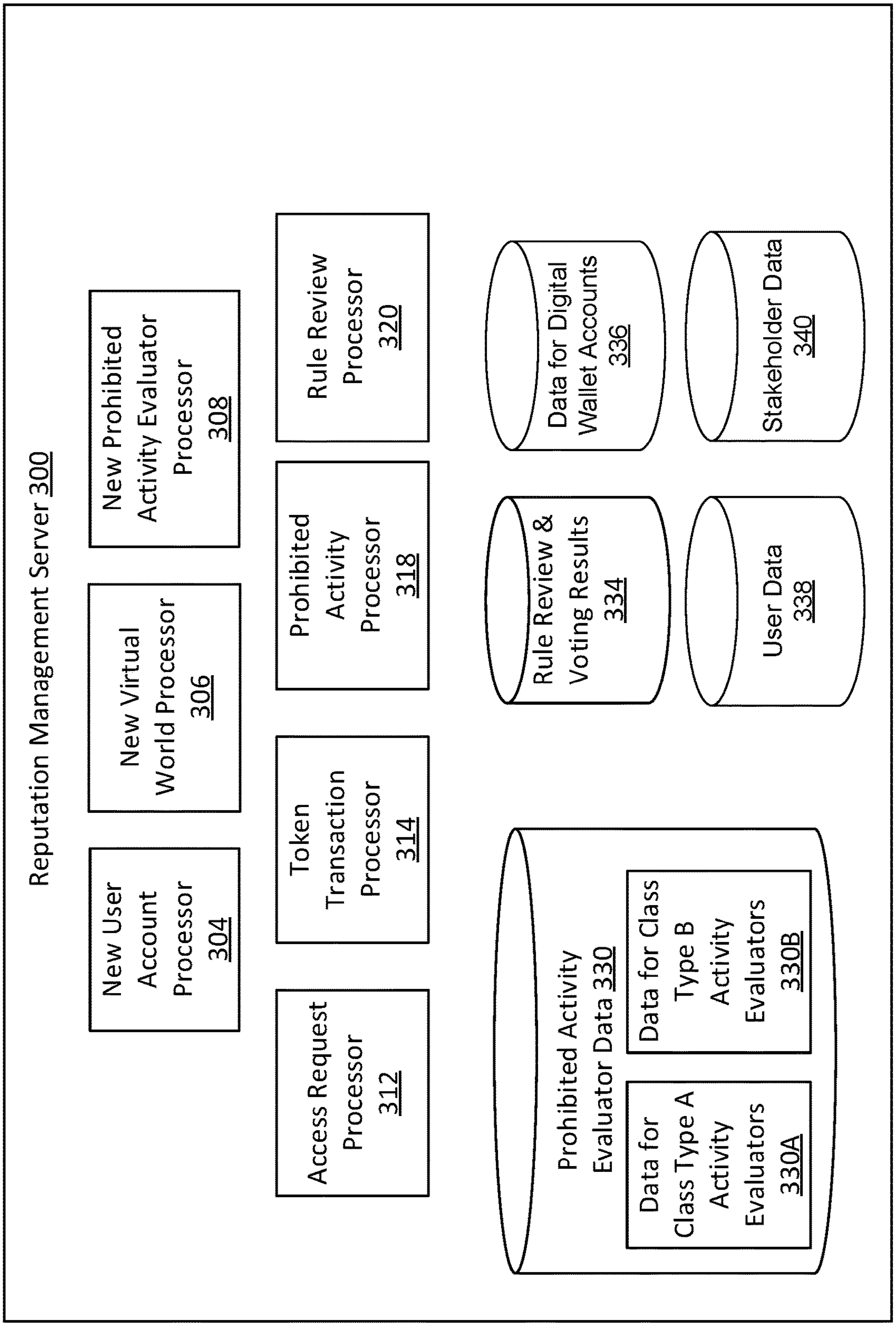
FIG. 3 shows a block diagram showing an example of a reputation management server.

FIG. 3 shows a block diagram showing additional details of a reputation management server 300 (e.g., the reputation management server 122). The reputation management server 300 may include various software elements, such as a new user account processor 304, a new virtual world processor 306, a new prohibited activity evaluator processor 308, an access request processor 312, a token transaction processor 314, a rule violation processor, and/or a rule review processor 320. The reputation management server 300 may also include a database 330 for storing data for prohibited activity evaluators, a database 334 for storing data about reviews and/or voting results of rules, a database 338 for storing data about users of the virtual worlds, a database 340 for storing data about stakeholders of the virtual worlds (e.g., investors, owners, employees, founders, shareholders, and/or members of a governing board of a company, organization, or other entity of the virtual worlds), and/or a database 336 for storing information for one or more digital wallet accounts of the reputation management server 300.

The new user account processor 304 may receive requests from one or more users via user devices. The requests may be to create new user accounts for the users to access various virtual worlds. As indicated above, a virtual world may be hosted and/or maintained by one or more virtual world servers. A virtual world server may for example, comprise one of the internal virtual world server(s) 132 and/or one of the external virtual world server(s) 136. A virtual world may be accessed by accessing, directly or indirectly, one or more virtual world servers that host and/or maintain that virtual world. A user may use the new user accounts to access the virtual worlds and/or perform activities within the virtual worlds. The new user account processor 304 may generate a new user account object (e.g., the user account object 440 in FIG. 4C described below) comprising information about the user requesting the new account, and save the new user account object in one or more blockchain networks. A blockchain network may for example, comprise an internal blockchain network(s) 134 and/or an external blockchain network(s) 138. The new user account processor 304 may also create a reputation account object for the user (e.g., the reputation account object 460 in FIG. 4D described below) if one does not exist already and store the reputation account object in one or more blockchain networks. The new user account processor 304 may execute a blockchain transaction to transfer a quantity of reputation tokens to a blockchain address associated with the user requesting the new user account. The reputation account object may indicate the quantity of reputation tokens transferred to the blockchain address of the user. Alternatively, if a reputation account object already exists for the user, the existing reputation object may indicate the quantity of reputation tokens currently associated with the user.

The database 338 may store information of various users of the virtual worlds, such as first names, last names, email addresses, home addresses, work addresses, credit card information, banking information, personal websites, phone numbers, MAC addresses, IP addresses, and/or other user data. Data for each user may be associated with a unique identifier (e.g., a hash, a database identifier, an identifier with multiple alphanumeric characters, etc.). The database 340 may store information about various stakeholders of the virtual worlds (e.g., investors, owners, employees, founders, shareholders, and/or members of a governing board of a company, organization, or other entity of the virtual worlds). Information about the stakeholders may include first names, last names, email addresses, home addresses, work addresses, credit card information, banking information, personal websites, phone numbers, MAC addresses, IP addresses, and/or other data. Data for each stakeholder may be associated with a unique identifier (e.g., a hash, a database identifier, an identifier with multiple alphanumeric characters, etc.). A stakeholder of a virtual world may also be a user of the virtual world, and the database 340 may store, for that stakeholder, an identifier associated with the user data stored in the database 338 for that stakeholder.

The new virtual world processor 306 may create virtual world objects (e.g., the virtual world object 420 in FIG. 4B described below) for one or more virtual worlds. The virtual world objects may comprise information about virtual worlds, such as rules that determine granting access to users to the virtual worlds and/or rules about prohibited activities in the virtual worlds. The new virtual world processor 306 may store the virtual world objects in one or more blockchain networks One or more user devices and/or nodes of one or more blockchain networks may be configured to determine whether a user has performed a prohibited activity in a virtual world based on the rules provided by the virtual world. Such user devices and/or nodes of the blockchain networks may be designated as prohibited activity evaluators. A user may also designate a user as a prohibited activity evaluator. The reputation management server 300 may manage different class types of prohibited activity evaluators. For example, prohibited activity evaluators of class type A may initially review the activities of a user to determine whether the user has performed a prohibited activity and/or violated one of the rules of a virtual world. Prohibited activity evaluators of class type B may review the decisions of the prohibited activity evaluators of class type A to affirm or reverse the decisions. The new prohibited activity evaluator processor 308 may process requests from one or more users, user devices, or nodes of one or more blockchain networks to be designated as prohibited activity evaluators. The new prohibited activity evaluator processor 308 may generate a new prohibited activity evaluator object (e.g., the prohibited activity evaluator object 470 in FIG. 4E described below) comprising information about the user, the user device, or the blockchain network node requesting to be designated as a prohibited activity evaluator, and store the new prohibited activity evaluator object in one or more blockchain networks. Information about the new prohibited activity evaluator may also be stored in the database 330. The database 330 for storing data about prohibited activity evaluators may store data 330A about prohibited activity evaluators of class type A and/or data 330B about prohibited activity evaluators of class type B.

The prohibited activity processor 318 may receive data about a user performing one or more activities in a virtual world that may be prohibited by the virtual world and/or violate one or more rules in the rulebooks of the virtual world. The data may be received from another user or identified from one or more blockchain networks that stores data about user activities in the virtual world. The prohibited activity processor 318 may create a rule violation object (e.g., the rule violation object 480 in FIG. 4F described below) comprising the data about the potentially prohibited activity or rule violation and store the rule violation object in one or more blockchain networks. Either a prohibited activity evaluator of class type A or a prohibited activity evaluator of class type B may identify the stored rule violation object from one or more blockchain networks and evaluate the data stored in the rule violation object to determine whether the activity performed by the user is prohibited or violates a rule of the virtual world.

The rule review processor 320 may manage the review and/or voting process of new rules that may be added to a rulebook of a virtual world, modifications of existing rules in the rulebook, canceling of existing rules in the rulebook, and/or adding new exceptions for existing rules in the rulebook. The rule review processor 320 may send messages to the stakeholders of the virtual world about the new or existing rule that needs review and may request the stakeholders to vote to accept or decline the rule. The stakeholders of the virtual world may record their vote in one or more blockchain networks. Additionally, the rule review processor 320 may identify votes cast by the stakeholders from the one or more blockchain networks and determine whether the majority of stakeholders have accepted the new rule or the modified rule in question. If a majority is achieved, the rulebook of the virtual world may be updated with the new rule or modified existing rule, or an existing rule may be canceled. Results from the review and/or voting process of the new rule or the existing rule by the rule review processor 320 may be stored in the database 334.

The token transaction processor 314 may execute blockchain transactions for the reputation management server 300. The blockchain transactions for the reputation management server 300 may include transferring reputation tokens to blockchain addresses of new users, transferring reputation tokens to blockchain addresses of users for time spent by the users interacting with the virtual worlds, transferring reputation tokens away or out of blockchain addresses of users as penalties for performing prohibited activities, transferring fungible tokens to blockchain addresses of prohibited activity evaluators for evaluating potentially prohibited activities or rule violations, and/or other blockchain transactions. The reputation management server 300 may also comprise a database 336 for storing information about any account the reputation management server 300 has with a digital wallet service. A digital wallet service may for example, comprise one or more of the internal digital wallet service 130 and/or the external wallet services 140. The database 336 may also store encryption keys associated with the reputation management server 300, such as the public keys of the reputation management server 300 and/or blockchain addresses of the reputation management server 300. Data stored in the database 336 may be used by the reputation management server 300 (e.g., by the new user account manager 304, the token transaction processor 314, the prohibited activity processor 318, etc.) to execute blockchain transactions of reputation tokens and/or fungible tokens.

Figure 4A:
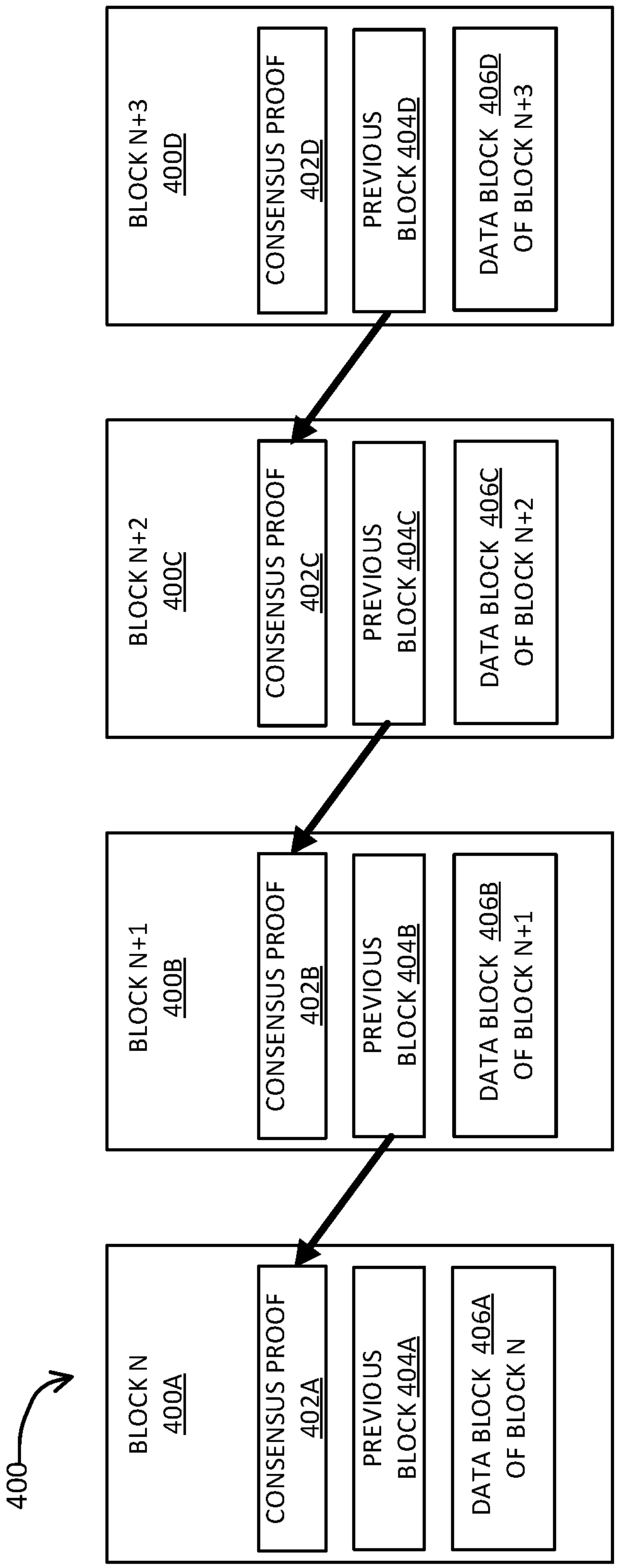
FIG. 4A shows an example of a blockchain data structure in a blockchain network that the reputation management server uses for providing reputation-based access to virtual worlds.

Additionally, the token transaction processor 314 may receive requests from users to execute blockchain transactions for buying or selling different types of fungible tokens (e.g., Bitcoin, Ethereum, etc.) by using fiat tokens (e.g., money that derives its value from government regulation or law, such as United States Dollar (USD), Euro, Pound Sterling, etc.). For example, a user may request the reputation management server 300 to execute a blockchain transaction to buy ten fungible tokens in exchange for ten USD or buy ten USD with ten fungible tokens. The token transaction processor 314 may also be configured as a cryptocurrency exchange platform where different types of fungible tokens are exchanged and/or traded (e.g., ten Bitcoin exchanged or traded for Ethereum). The token transaction processor 314 may also receive requests from users to execute blockchain transactions where fungible tokens are used to buy virtual objects (e.g., a castle in a virtual world) or physical objects (e.g., a painting) and/or where fungible tokens are received because of sales of physical and/or virtual objects. The reputation management server 300 may execute blockchain transactions (e.g., requests to trade fungible tokens, fiat tokens, financial transactions of fungible and/or fiat tokens, and payment for purchases) based on requests from users. A portion of total tokens (e.g., fungible tokens or fiat tokens) in such transactions may be transferred to one or more blockchain addresses of the reputation management server 300 (e.g., one fungible token is transferred to a blockchain address of the reputation management server 300 in a transaction of one hundred fungible tokens). A blockchain network may comprise a network of nodes (e.g., computing devices, such as the computing device described in FIG. 2) in communication with each other and/or hosting copies of a blockchain (e.g., blockchain ledgers). FIG. 4A shows an example blockchain 400 stored by the nodes of the blockchain network. The blockchain 400 may be used by the reputation management server 300 to regulate or enable user accesses, entrances, or log-ins to the virtual worlds and/or user activities or interactions in the virtual worlds. The blockchain 400 may comprise a chain of blocks. For example, the blockchain 400 may comprise blocks 400A, 400B, 400C, and/or 400D. For clarity, only four blocks are included in the example blockchain 400 of FIG. 4A, but any number of blocks may be present in the blockchain 400. Furthermore, this blockchain 400 may be replicated among the various nodes of the blockchain network.

The blocks (e.g., blocks 400A, 400B, 400C, and/or 400D) may comprise one or more data blocks, such as data blocks 406A, 406B, 406C, and 406D. For clarity, only one data block 406A-D is shown in each block of the example blockchain 400 of FIG. 4A, but any number of data blocks may be present. The data blocks 406 A-D (e.g., data blocks in the blocks 400A, 400B, 400C, and/or 400D) may store various data required by the reputation management server 300 to regulate user accesses and/or activities in the virtual worlds and/or other data associated with the users and/or virtual worlds. For example, the data blocks 406A-D may store blockchain transactions of reputation tokens, blockchain transactions of fungible tokens, blockchain transactions of non-fungible tokens, information about virtual worlds, rules regarding prohibited activities in the virtual worlds, information about user accounts, information about user' access to and exit from the virtual worlds, users' balances of reputation, fungible, and/or non-fungible tokens, information about the performance of prohibited activities by user s in the virtual worlds that violate rules of the virtual worlds, information about decisions about the violations or prohibited activities, information about votes for new rules, information about votes for modifying existing rules, information about votes for canceling existing rules, and/or other data.

The mining nodes in a blockchain network may construct a block (e.g., blocks 400A, 400B, 400C, and/or 400D), validate the data in the data block (e.g., the data blocks 406A-D) of the constructed block, and reach a consensus proof (e.g., the consensus proofs 402A, 402B, 402C, 402D) on the constructed block before adding the constructed block to the blockchain 400. The newly constructed block may then be broadcasted to the entire network of nodes in the blockchain network. While each mining node in the blockchain network can create its own block, only the block with a consensus proof is accepted to be added to the blockchain. The consensus mechanism ensures that the nodes agree on the same block to be added to the blockchain. The blocks (e.g., blocks 400A, 400B, 400C, and/or 400D) in the blockchain 400 may be identified by their consensus proof 402A-D. The consensus proof 402A-D may be a cryptographic hash representing the legitimacy of the data in the data blocks 406A-D. The cryptographic hash may be determined by performing complex cryptographic computations on the data block 406 with a consensus algorithm. Various consensus algorithms may be used to determine the consensus proofs of new blocks, such as Proof of Work (PoW), Proof of Stake (PoS), Delegated Proof of Stake (DPoS), Transaction as Proof of Stake (TaPoS), Delegated Byzantine Fault Tolerance (dBFT), Proof of Importance (PoI), and/or Proof of Elapsed Time (PoET). The blocks (e.g., blocks 400A, 400B, 400C, and/or 400D) may form a sequence where each block 400 includes a reference 404 to the consensus proof 402 of the previous or parent block 400, forming a chain of blocks. For example, the previous block reference 404D of block 400D may reference the consensus proof 402C of block 400C, the previous block reference 404C of block 400C may reference the consensus proof 402B of block 400B, and/or the previous block reference 404B of block 400B may reference the consensus proof 402A of block 400A.

Figure 4B:
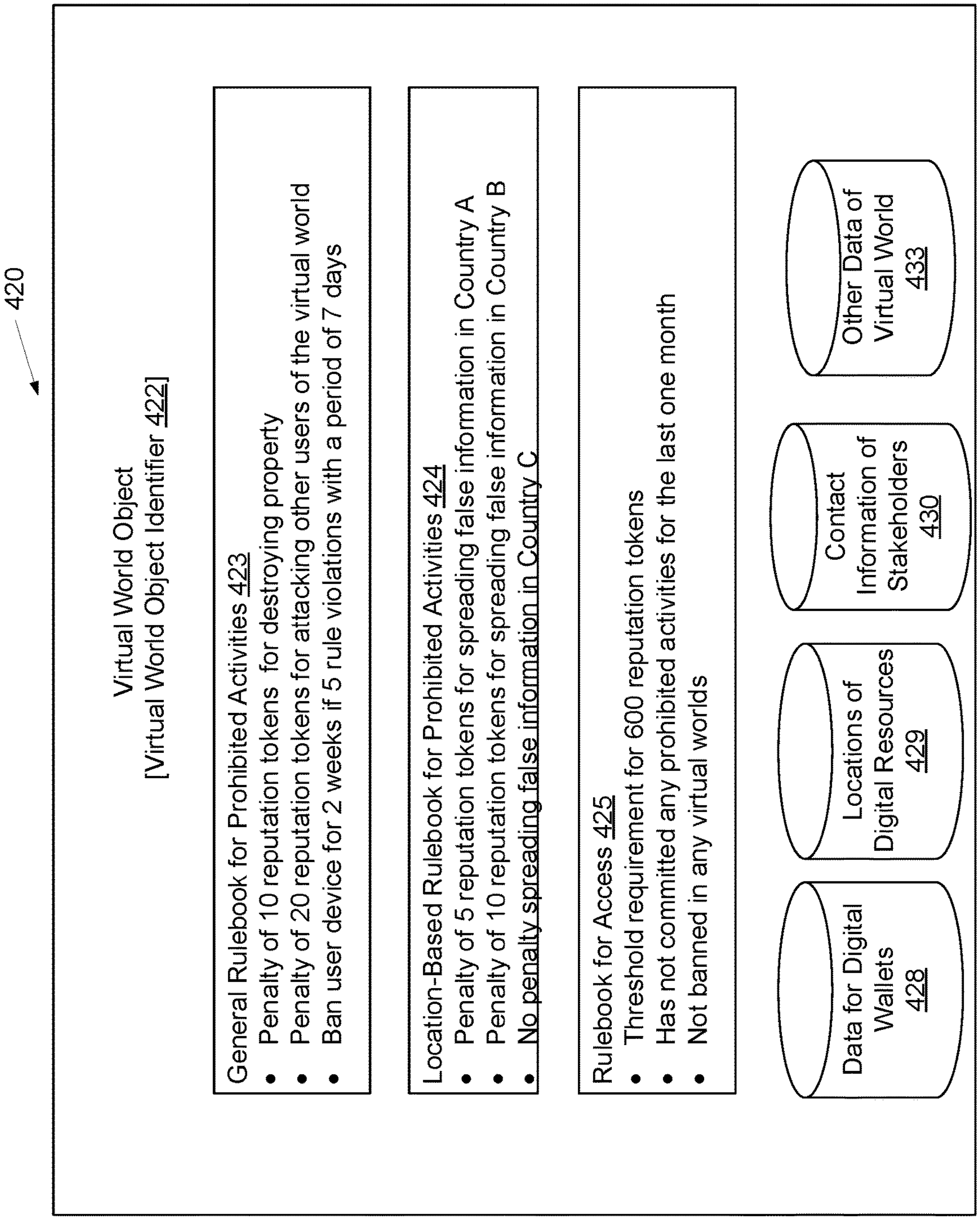
FIGS. 4B, 4C, 4D, 4E, and 4F show example data objects stored in the blockchain network.

FIG. 4B shows an example virtual world data object 420 that may comprise information about a virtual world and may be stored in one or more data blocks (e.g., the data block 406) of one or more blocks (e.g., block 400A-D) of one or more blockchain networks. The virtual world data object 420 may be a smart contract (e.g., digital contract) that comprises computer code and/or instructions that any node of the one or more blockchain networks may execute. A smart contract may also provide a storage mechanism for storing data related to the smart contract. A smart contract may be associated with a smart contract address and/or a unique identifier. Alternately, the virtual world data object 420 may comprise a metadata object, which may take various forms, such as a JavaScript Object Notation (JSON) object or an Extensible Markup Language (XML) document object model (DOM).

The reputation management server 300 may maintain a virtual world data object 420 for each virtual world. The virtual world object 420 may be associated with a unique virtual world object identifier 422. The unique virtual world object identifier 422 may be used as an address for the virtual world object 420 in the one or more blockchain networks storing the virtual world object 420.

The virtual world object 420 may comprise one or more rulebooks, such as a rulebook for access 425, a general rulebook for prohibited activities 423, and/or a location-based rulebook for prohibited activities 424. The rules in the rulebooks (e.g., the rulebook for access 425, the general rulebook for prohibited activities 423, the location-based rulebook for prohibited activities 424, and/or other rulebooks) may be provided by the virtual world associated with the virtual world object 420. Additionally, new rules may be added to the rulebooks, and/or existing rules may be canceled or modified.

The rulebook for access 425 may comprise one or more rules to be satisfied by a user to gain permission to access the virtual world associated with the virtual world object 420. For example, the rules in the rulebook for access 425 may include a threshold quantity of reputation tokens needed by the user to gain permission (e.g., 600 reputation tokens). Additionally, or alternatively, the rules in the rulebook for access 425 may indicate that to gain permission to access the virtual world, the user may not perform any prohibited activities in the virtual world associated with the virtual world object 420 or other virtual worlds for a predetermined amount of time (e.g., the last one month). The rules in the rulebook for access 425 may also indicate that permission for access may not be granted to users banned from participating in activities in the virtual world associated with the virtual world object 420 or other virtual worlds. The rulebook for access 425 may comprise other rules related to accessing the virtual world associated with the virtual world object 420.

The general rulebook for prohibited activities 423 may comprise one or more rules about activities or behaviors that are prohibited in the virtual world associated with the virtual world object 420 and may apply to all users accessing or performing activities in the virtual world. Example rules in the general rulebook for prohibited activities 423 may include rules about prohibited activities such as destroying virtual properties, attacking avatars of other users, harassing, trolling, and other prohibited activities. The rules in the general rulebook for prohibited activities 423 may also indicate banning a user from accessing the virtual world for a time period (e.g., two weeks) if the user has violated a certain quantity of rules (e.g., five rules in the general rulebook for prohibited activities 423 and/or the location-based rulebook for prohibited activities 424) within a period of time (e.g., the last seven days). Additionally, the general rulebook for prohibited activities 423 may indicate a quantity of reputation tokens that will be penalized for the prohibited activities. For example, ten reputation tokens may be penalized for destroying properties, and/or twenty reputation tokens may be penalized for attacking other users.

The location-based rulebook for prohibited activities 423 may comprise rules that apply to users accessing or performing activities from a particular physical location. The rules in the location-based rulebook for prohibited activities 423 for that particular location may not apply to users located in a different physical location. The particular physical location may comprise one or more countries, one or more states in a country, and/or one or more zones. Example rules in the location-based rulebook for prohibited activities 423 may include penalizing five reputation tokens for spreading false information in country A and ten reputation tokens in country B, while spreading false information is not prohibited in country C.

The virtual world object 420 may comprise one or more addresses (e.g., websites, Internet Protocol (IP) address, Media Access Control (MAC) addresses) for the locations of the digital resources 429 associated with the virtual world. The digital resources may comprise computer instructions or code, graphics, video, text, music, and other representations needed to create the virtual world's two-dimensional or three-dimensional virtual environments. Additionally, the virtual world object 420 may comprise contact information (e.g., physical addresses, phone numbers, email addresses, MAC addresses, IP addresses, etc.) of the stakeholders 430 of the virtual world who may vote to add new rules, modify existing rules, or cancel existing rules in the rulebook for access 425, the general rulebook for prohibited activities 423, and/or location-based rulebook for prohibited activities 424. The reputation management server 300 may use the contact information of the stakeholders 430 to send messages to the stakeholders about voting for adding new rules, modifying existing rules, or canceling existing rules. Additionally, or alternatively, the virtual world object 420 may store identifiers (e.g., hashes, database identifiers, any identifiers of alphanumeric characters, etc.) and/or addresses (e.g., weblinks, IP address, MAC address) for data about the stakeholders stored in the reputation management server 300 (e.g., in database 338 for storing user data or database 340 for storing stakeholder data) and/or other servers (e.g., other servers located in the local office 103 or servers not associated with the local office 103). The virtual world object 420 may also store identifiers and/or addresses of user account objects (e.g., the user account objects in FIG. 4C) associated with the stakeholders and stored in one or more blockchain networks.

The virtual world object 420 may also comprise data 428 about any digital wallet accounts of the virtual world. Furthermore, the database 428 may also store blockchain addresses associated with the virtual world and/or encryption keys associated with the virtual world, such as the public keys of the virtual world. Additionally, the virtual world object 420 may also include other data 433 that may be pertinent to the operation of a reputation management server 300, such as contact information for the virtual world, and/or other data.

Figure 4C:
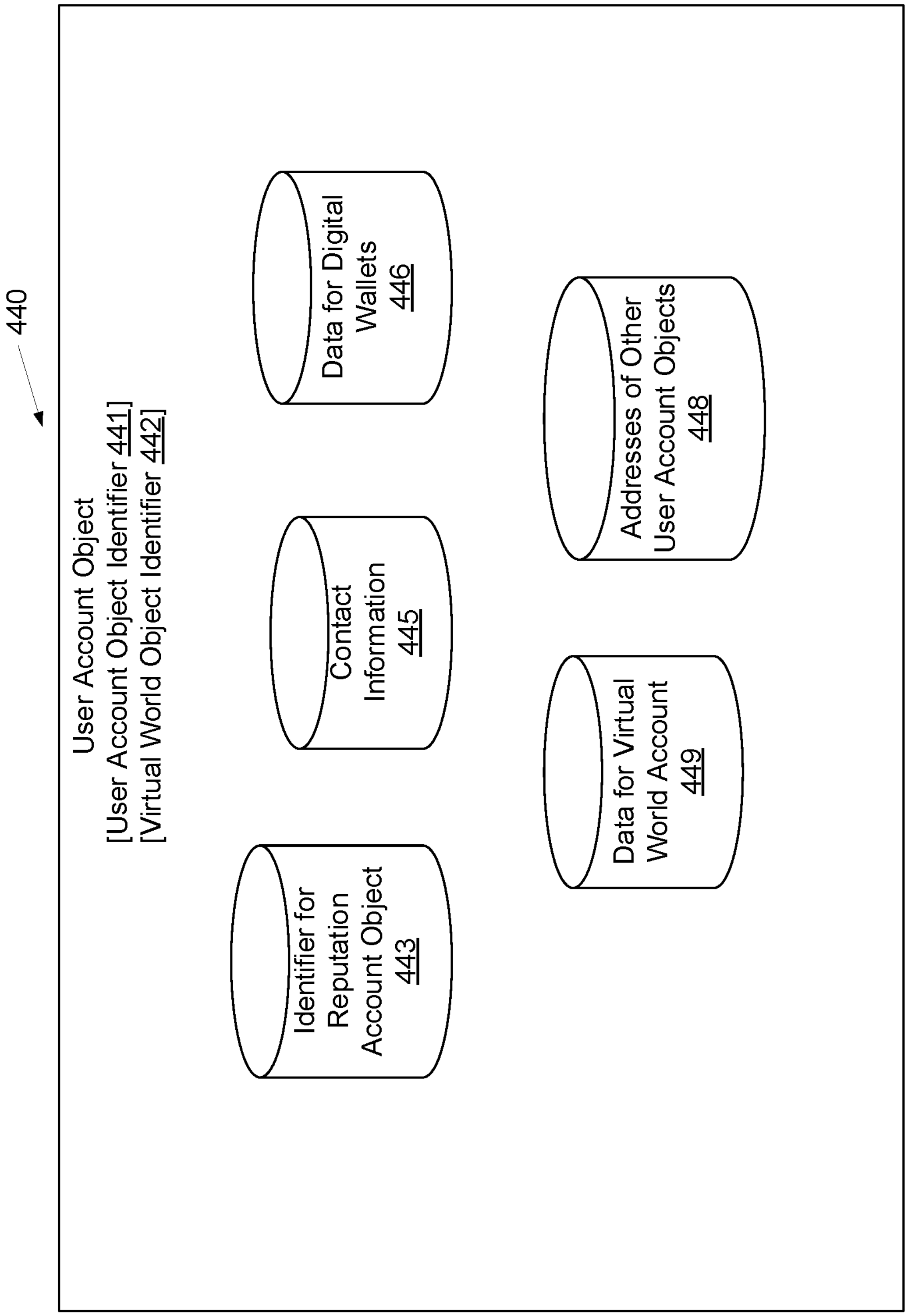

FIG. 4C show an example user account object 440 that a user may use to access and/or traverse a virtual world. The user account object 440 may be stored in one or more data blocks (e.g., the data block 406) of one or more blocks (e.g., blocks 400A-D) of one or more blockchain networks. The user account object 440 may be a smart contract, a JSON object, an XMLDOM, or other data objects.

Each user account object 440 stored in a blockchain network may be associated with a unique user account object identifier 441. The user account object identifier 441 may be used as an address for the user account object 440 in the blockchain network such that the user account object 440 may be later retrieved or identified from the blockchain by using the user account object identifier 441. Additionally, any data representing activities of the user associated with the user account object 440 and stored in the blockchain network may also comprise the unique user account object identifier 441. The user account object 440 may also comprise a virtual world object identifier 442 of a virtual world object (e.g., the virtual world object identifier 422 in the virtual world object 420) associated with the virtual world. A single user account object 440 may be used to access multiple virtual worlds, and the user account object 440 may comprise multiple virtual world object identifiers 441.

The user account object 440 may comprise one or more addresses 448 (e.g., user account object identifier 441) for other user accounts (e.g., other user account objects 400) associated with the user and used to access virtual worlds other than the virtual world represented by the virtual world object identifier 442. The virtual world object 420 may also comprise data 449 needed to access the virtual world represented by the virtual world object identifier 442, such as a username, a password, a profile picture, a two-dimensional or a three-dimensional avatar, and/or other data. The user account object 440 may also comprise data 446 about any digital wallet accounts, blockchain addresses, and/or encryption keys (e.g., public keys) associated with the user. Additionally, the user account object 440 may store contact information 445 for the user, such as a first name, a last name, email addresses, home addresses, work addresses, credit card information, banking information, personal website, phone number, MAC addresses of the user devices associated with the user, IP addresses of the user devices associated with the user, and/or other user data. Different types of user data may be stored as individual hashes (e.g., a hash for the name, a hash for the email address, a hash for the home address, and a hash for the phone number). Also, or alternatively, some or all the user data in the contact information 445 may be stored as a single hash. Additionally, or alternatively, the user account object 440 may store identifiers (e.g., hashes, database identifiers, any identifiers of alphanumeric characters, etc.) and/or addresses (e.g., weblinks, IP address, MAC address) for data about the user stored in the reputation management server 300 (e.g., in database 338 for storing user data) and/or other servers (e.g., other servers located in the local office 103 or servers not associated with the local office 103). The user account object 440 may be linked to a reputation account associated with the user (e.g., the reputation account object 460 of FIG. 4D) and may comprise an identifier for the reputation account (e.g., the reputation object identifier 461).

Figure 4D:
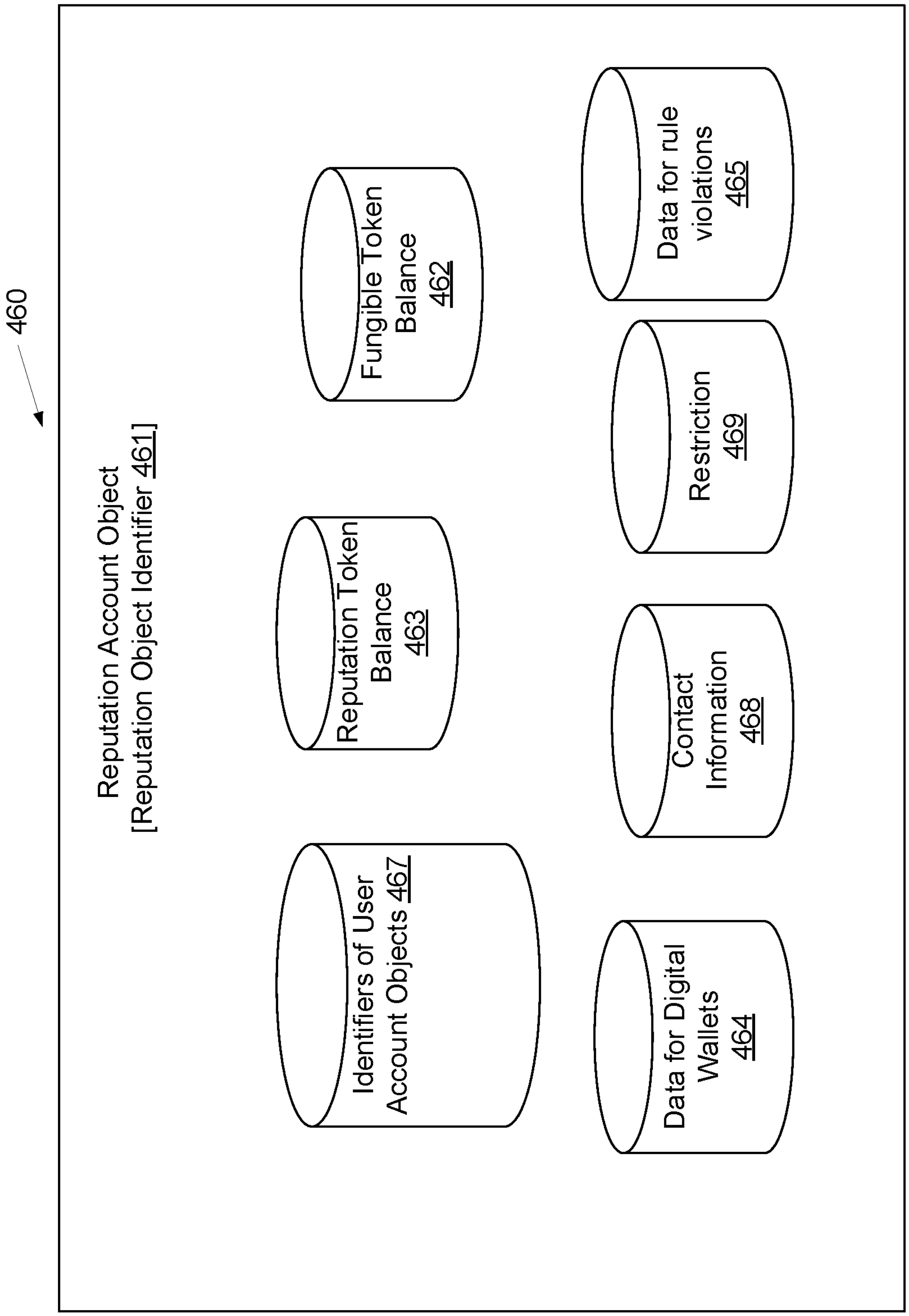

FIG. 4D show an example reputation account object 460 that may track a quantity or balance of reputation tokens 463 associated with a user and/or that may be used to request access to a virtual world. The reputation account object 460 may also track a fungible token quantity or balance 462 associated with the user and/or one or more user devices of the user. The reputation account object 460 may also track any restrictions 469 imposed on the user that will limit the user from accessing the virtual worlds. Example restrictions may include being banned from a virtual world for a day, three days, a week, a month, and/or a year. The reputation account object 460 may also comprise data 465 about any rules violated by the user by performing prohibited activities in the virtual world and the time and/or date the prohibited activities were performed.

Additionally, the reputation account object 460 may comprise data 464 about any digital wallet accounts of the user, blockchain addresses associated with the user, and/or the public keys of the user. The reputation account object 460 may also store contact information 468 for the user, such as a first name, a last name, email addresses, home addresses, work addresses, credit card information, banking information, personal website, phone number, MAC addresses, IP addresses, and/or other user data. Different types of user data may be stored as separate hashes (e.g., a hash for the name, a hash for the email address, a hash for the home address, and a hash for the phone number). Also, or alternatively, some or all the user data in the contact information 468 may be stored as a single hash. Additionally, or alternatively, the reputation account object 460 may store identifiers (e.g., hashes, database identifiers, any identifiers of alphanumeric characters, etc.) and/or addresses (e.g., weblinks, IP address, MAC address) for data about the user stored in the reputation management server 300 (e.g., in database 338 for storing user data) and/or other servers (e.g., other servers in the local office 103 or servers not associated with the local office 103). The reputation account object 460 may be linked to one or more user account objects (e.g., the user account object 440) associated with the user for accessing the various virtual worlds and may comprise identifiers 467 for the user account objects (e.g., the user account object identifier 441). The reputation account object 460 may be a smart contract, a JSON object, an XMLDOM, or data objects, and/or may be stored in one or more data blocks (e.g., the data block 406) of one or more blocks (e.g., blocks 400A-D) of one or more blockchain networks. A unique reputation object identifier 461 may be used as an address for the reputation account object 460 in a blockchain network. The reputation account object 460 may be retrieved or identified in the blockchain network by the unique reputation object identifier 461.

Figure 4E:
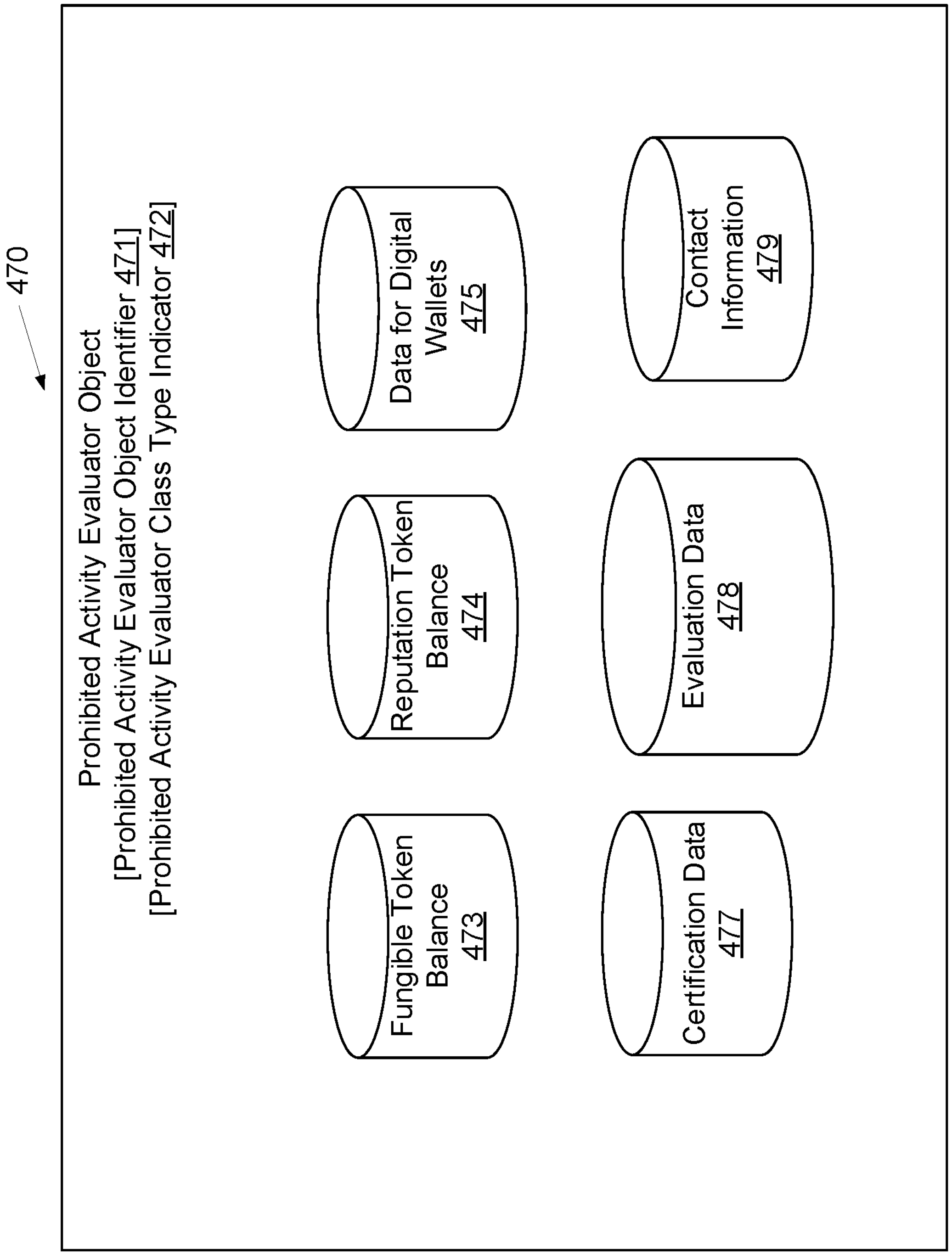

FIG. 4E shows a prohibited activity evaluator object 470 that may represent a user, a user device, a node in a blockchain network, or another computing devices designated as a prohibited activity evaluator by the reputation management server 300. The prohibited activity evaluator object 470 may be a smart contract, a JSON object, an XMLDOM, or other data objects, and/or may be stored in one or more data blocks (e.g., the data block 406) of one or more blocks (e.g., blocks 400A-D) of one or more blockchain networks. A unique prohibited activity evaluator object identifier 471 may be used as an address for the prohibited activity evaluator object 470 in a blockchain network. The reputation management server may manage prohibited activity evaluators of different class types, for example, prohibited activity evaluators of class type A and prohibited activity evaluators of class type B, and the designated class type may in indicated by the prohibited activity evaluator class type indicator 472 in the prohibited activity evaluator object 470.

The prohibited activity evaluator object 470 may track a quantity or balance of reputation tokens 474 and/or a quantity or balance of fungible tokens 473 associated with the prohibited activity evaluator being represented by the prohibited activity evaluator object 470. Additionally, the prohibited activity evaluator object 470 may comprise data 475 about any digital wallet accounts, blockchain addresses, and/or public keys of the device associated with the prohibited activity evaluator. The prohibited activity evaluator 470 may also store contact information 479 for a user designated as the prohibited activity evaluator, such as a first name, a last name, email addresses, home addresses, work addresses, credit card information, banking information, personal website, phone number, and/or other user data. The prohibited activity evaluator 470 may also store contact information 479 for devices designated as the prohibited activity evaluator, such as MAC addresses, IP addresses, and/or other data. The different types of user data may be stored as separate hashes (e.g., a hash for the name, a hash for the email address, a hash for the home address, and a hash for the phone number). Also, or alternatively, some or all the user data in the contact information 479 may be stored as a single hash. Additionally, the prohibited activity evaluator object 470 may store identifiers (e.g., hashes, database identifiers, any identifiers of alphanumeric characters, etc.) and/or addresses (e.g., weblinks, IP address, MAC address) for user data stored in the reputation management server 300 (e.g., in database 338 for storing user data) for the user of the device designated as the prohibited activity evaluator and/or user data stored in other servers (e.g., servers located in the local office 103 or servers not associated with the local office 103).

The prohibited activity evaluator object 470 may store one or more certifications 477 needed by the device designated as the prohibited activity evaluator to evaluate activities by users in the virtual worlds. For example, the prohibited activity evaluator may need to receive certifications from the virtual worlds where the prohibited activities are being performed. The prohibited activity evaluator may only be allowed to evaluate prohibited activities in certain virtual worlds from which the prohibited activity evaluator has received certifications. For example, the prohibited activity evaluator may receive certifications that will allow the prohibited activity evaluator to evaluate potential prohibited activities of users located in a certain physical location (e.g., a country, a state, and/or a zone). For example, a prohibited activity evaluator may receive certification to review the activities of users located in the United States of America, and other prohibited activity evaluators without such certifications may not evaluate the activities of users located in the United States of America. Certifications may also be received from governmental agencies and/or other organizations. Evaluation data 478 from the evaluations of rule violations and/or prohibited activities performed by the prohibited activity evaluator associated with the prohibited activity evaluator object 470 may be stored in the prohibited activity evaluator object 470.

Figure 4F:
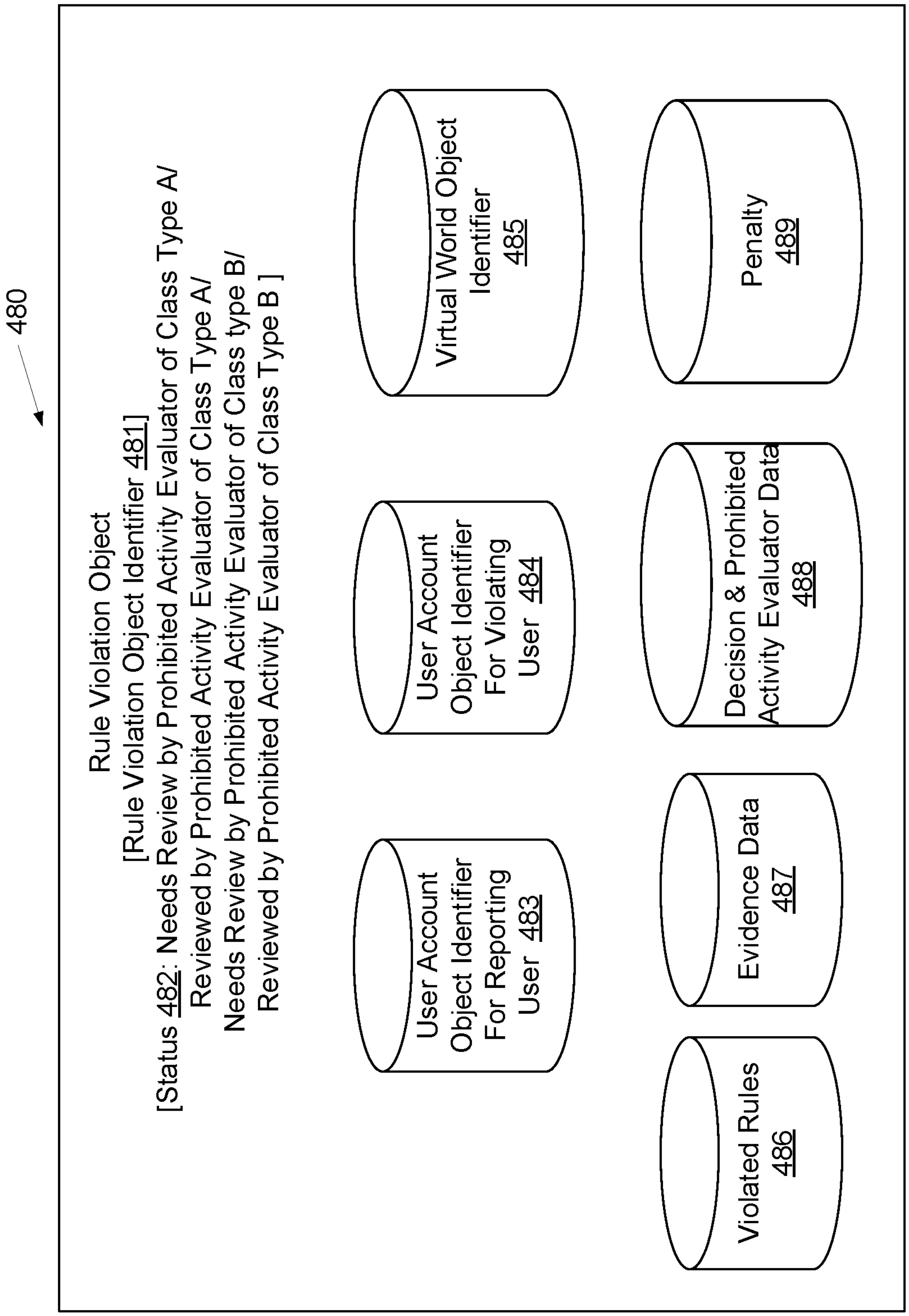

FIG. 4F shows a rule violation object 480 comprising information about an activity performed by a user in a virtual world that may be prohibited according to rulebooks (e.g., the rulebook for access 425, the general rulebook for prohibited activities 423, and/or location-based rulebook for prohibited activities 424) of the virtual world. The rule violation object 480 may be a smart contract, a JSON object, an XMLDOM, or other data objects, and/or may be stored in one or more data blocks (e.g., the data block 406) of one or more blocks (e.g., blocks 400A-D) of one or more blockchain networks (e.g., the internal blockchain network (s) 134 and/or the external blockchain network(s) 138). The rule violation object 480 may comprise a unique rule violation object identifier 481. The unique rule violation object identifier 481 may be used as an address (e.g., for retrieval and/or identification) for the rule violation object 480 in a blockchain network. Additionally, the rule violation object 480 may comprise a status 482 that indicates the current status of the reviewing process of the potential rule violation or prohibited activity. As the rule violation object 480 may get reviewed by prohibited activity evaluators of different class types (e.g., prohibited activity evaluators of class type A and prohibited activity evaluators of class type B), the status 482 may indicate that the rule violation object 480 needs review by a prohibited activity evaluator of class type A, has been reviewed by a prohibited activity evaluator of class type A, needs review by a prohibited activity evaluator of class type B, has been reviewed by a prohibited activity evaluator of class type B, and/or other statuses.

The rule violation object 480 may store a user account object identifier 484 (e.g., the user account identifier 441) for a user account object (e.g., the user account object 440) associated with the user that performed the activity, and/or a virtual world object identifier 485 (e.g., the virtual world object identifier 431) for a virtual world object (e.g., the virtual world object 430) associated with the virtual world where the activity was performed. In addition, the rule violation object 480 may also indicate the violated rules 486 from the rulebooks of the virtual world, any data 487 that may be used as evidence for the rule violations (e.g., a video of the user performing the act, a written post or content shared by the user, transactions executed by the user, etc.), decisions 488 about the activity (e.g., whether the activity is prohibited or not, has violated a rule or not), and any penalty 489 associated with the activity (e.g., a penalty for five or ten reputation tokens, banned from the virtual world for a week, etc.).

Another user or a node of a blockchain network may report or identify the activity of the rule violation object 480. The rule violation object 480 may store a user account object identifier 483 (e.g., the user account identifier 441) for a user account object (e.g., the user account object 440) associated with the reporting user or node.

A single blockchain network may store some or all of the data required by the reputation management server 300 to regulate user accesses and/or activities in the virtual worlds. For example, the data blocks 406A-D may store blockchain transactions of reputation tokens, blockchain transactions of fungible tokens, blockchain transactions of non-fungible tokens, virtual world objects 420 for the different virtual worlds, user account objects 440 used by users to access the virtual worlds, reputation account objects 460 associated with the users, prohibited activity evaluator objects 470, rule violation objects 480, blockchain transaction comprising votes, and/or other data. Also or alternatively, a separate blockchain network may be maintained for each type of data (e.g., a blockchain network to store only blockchain transactions of fungible and reputation tokens, a blockchain network to store only virtual world objects 420, a blockchain network to store only user account objects 440, a blockchain network to store only reputation account objects 460, a blockchain network to store only prohibited activity evaluator objects 470, a blockchain network to store only rule violation objects 480, and/or a blockchain network to store only blockchain transaction comprising votes). A blockchain network may be used to store data related to a particular virtual world (e.g., a blockchain network to store data about the virtual world A and another blockchain network to store data about the virtual world B). Separate blockchain networks may be used to store user account objects 440 for different virtual worlds (e.g., a blockchain network to store user account objects 440 associated with virtual world A and another blockchain network to store user account objects 440 associated with virtual world B).

FIGS. 5A, 5B, 5C, 5D, 5E, 5F, and 5G show an example method for regulating access of a user to virtual worlds and/or activities of a user in the virtual worlds. The steps in FIGS. 5A, 5B, 5C, 5D, 5D, 5E, 5F, and 5G may be performed by the reputation management server 300. For example, the steps in 5A, 5B, 5C, 5D, 5E, 5F, and 5G may be performed by various software components of the reputation management server 300, such as the new user account processor 304, the new virtual world processor 306, the new prohibited activity evaluator processor 308, the access request processor 312, the token transaction processor 314, the prohibited activity processor 318, and/or the rule review processor 320 in FIG. 3. Additionally, or alternatively, the method of 5A, 5B, 5C, 5D, 5E, 5F, and 5G may be performed by another device (e.g., any one of the user devices in the premises 102*a*, the mobile devices 125, nodes of the internal blockchain networks 134, nodes of the external blockchain networks 138, and/or other computing devices). One, some, or all of the steps may be rearranged or otherwise modified. Steps may be omitted and/or other steps added.

Figure 5A:
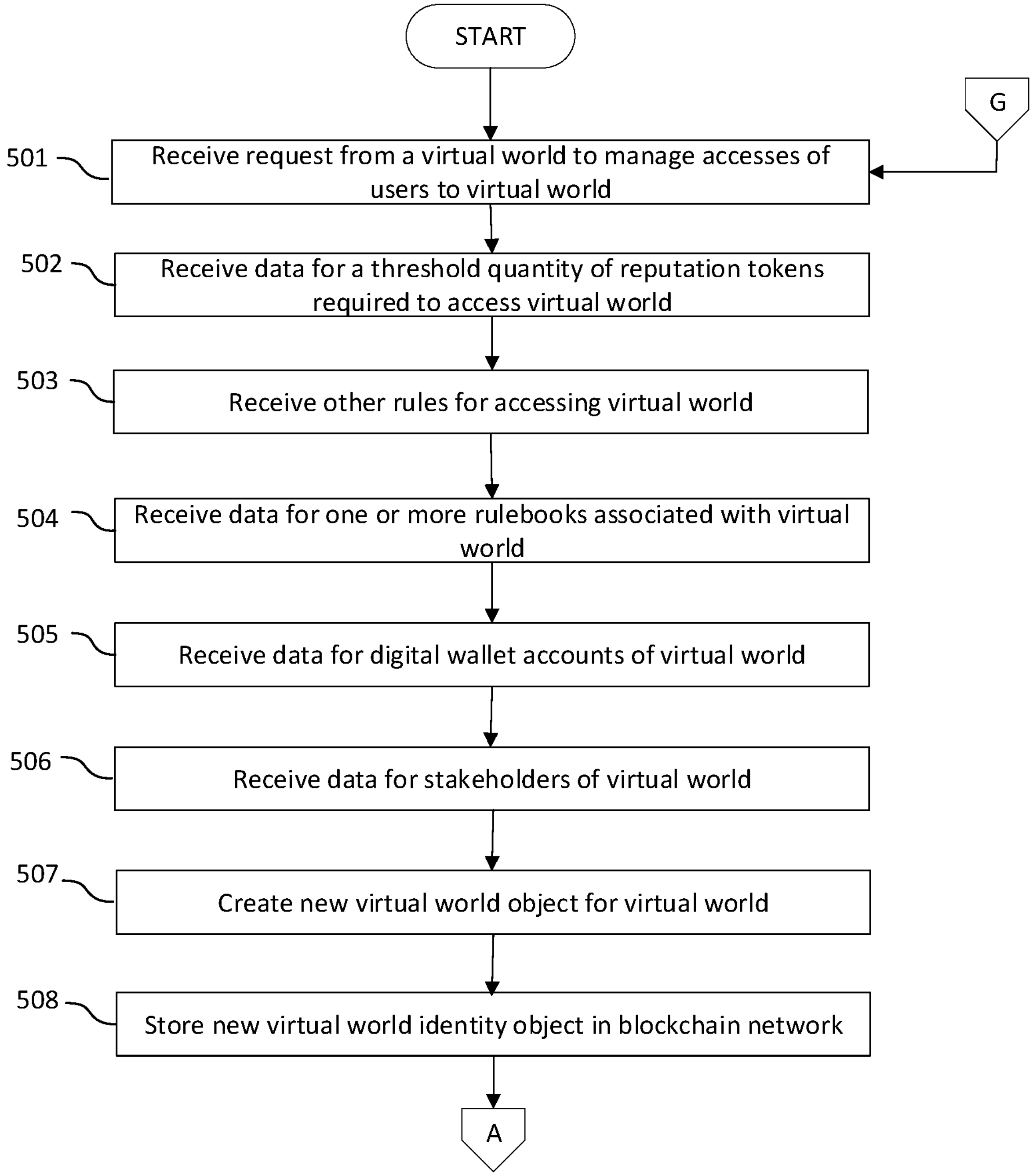
FIGS. 5A, 5B, 5C, 5D, 5E, 5F, and 5G show a flow chart showing steps of an example method for regulating user accesses and/or activities in virtual worlds.

Steps 501-508 of FIG. 5A relate to creating a virtual world object (e.g., the virtual world object 420) for a virtual world. At step 501 of FIG. 5A, a request may be received from the virtual world to manage requests from users to access the virtual world. Accessing the virtual world may comprise a user requesting, via a user device, a reputation management server 300 to permit the user to access the virtual world based on data stored by the reputation management server 300 about the user and/or the virtual world in one or more blockchain networks, instead of the user sending the request directly to the virtual world. Alternatively, or additionally, the user may send, via a user device, a request to access a virtual world directly to the virtual world, and the virtual world may send a message to the reputation management server 300 to determine whether the user has permission to access the virtual world. As another example, the user may send a request to access a virtual world directly to the virtual world via a user device, and the virtual world may determine whether the user has permission to enter the virtual world based on data stored by the reputation management server 300 about the user and/or the virtual world in the one or more blockchain networks.

At step 502, data indicating a threshold quantity of reputation tokens needed by a user to access the virtual world of step 501 may be received from the virtual world. For example, one virtual world may send a message indicating that a user requesting access to the virtual world may require at least 600 reputation tokens, while another stricter virtual world may require that the user have at least 800 reputation tokens may gain access to the stricter virtual world. Alternatively, a virtual world may send data indicating there is no required threshold quantity of reputation tokens for accessing the virtual world.

At step 503, data about other rules a user needs to satisfy to access the virtual world of step 501 may be received from the virtual world. For example, the other rules may indicate not to grant access to new users (e.g., users with a reputation account object 460 created less than two years ago), users who have performed a prohibited activity (e.g., destroyed another user's virtual property, attacked an avatar, etc.) within a predetermined time period (e.g., within the last one week, two weeks, or a month), and/or users banned from the virtual world of step 501 or other virtual worlds.

At step 504, data about one or more rulebooks of the virtual world of step 501 (e.g., the rulebook for access 425, the general rulebook for prohibited activities 423, and/or the location-based rulebook for prohibited activities 424) may be received. The data may comprise links to websites storing the rulebooks, addresses (e.g., IP address or MAC address) of computing devices storing the rulebooks, or addresses (e.g., IP address or MAC address) of nodes of one or more blockchain networks storing the rulebooks. The rulebooks, the links to the websites, and/or addresses of the computing devices or nodes may be forwarded to prohibited activity evaluators (e.g., based on the contact information for prohibited activity evaluators stored in the database 330 in the reputation management server 300).

At step 505, data may be received about one or more digital wallet accounts of the virtual world of step 501. The data received at step 505 may also comprise encryption keys (e.g., public keys) and/or blockchain addresses associated with the virtual world of step 501.

At step 506, data may be received about one or more stakeholders of the virtual world of the virtual world of step 501. The stakeholders may vote to add new rules, modify existing rules, or cancel existing rules in the rulebooks of the virtual world of step 501. Data received at step 506 may comprise addresses, phone numbers, email addresses, MAC addresses, IP addresses, and/or other contact information of the stakeholders.

At step 507, a new virtual world object (e.g., the virtual world object 420) may be created based on the data received at steps 502, 503, 504, 505, and/or 506. For example, data received at step 502 (regarding the threshold quantity of reputation tokens needed by a user to access the virtual world) and step 503 (regarding other rules that a user needs to satisfy to access the virtual world) may be stored in the rulebook for access 425 of the new virtual world object. Data received at step 504 about the one or more rulebooks of the virtual world of step 501 may be stored in the general rulebook for prohibited activities 423 and/or location-based rulebook for prohibited activities 424 of the new virtual world object. The data about the rulebooks may also be forwarded to prohibited activity evaluators (e.g., based on the information stored for prohibited activity evaluators in the database 330 in the reputation management server 300). Data received at step 505 may be stored as the data for digital wallets 428 in the new virtual world object, and/or the data received at step 506 may be stored as the contact information of stakeholders 430 in the new virtual world object.

At step 508, the new virtual world object of step 507 may be stored in one or more blockchain networks. Storing the new virtual world object of step 507 may comprise sending the new virtual world object to a node of a blockchain network (e.g., computing devices forming the blockchain network). The nodes may create a new block or select an existing block (e.g., blocks 400A-D), add the new virtual world object to a data block (e.g., the data blocks 406A-D) of the new or existing block, and/or validate the data block comprising the new virtual world object by determining a consensus proof on the new or existing block (e.g., consensus proof based on one or more consensus algorithms adopted by the blockchain network). The new or existing block with the new virtual world object may then be broadcasted to the entire network of nodes in the blockchain network to be added to the blockchain (e.g., the blockchain 400) maintained by the nodes if a majority or all of the nodes accept the consensus proof.

Figure 5B:
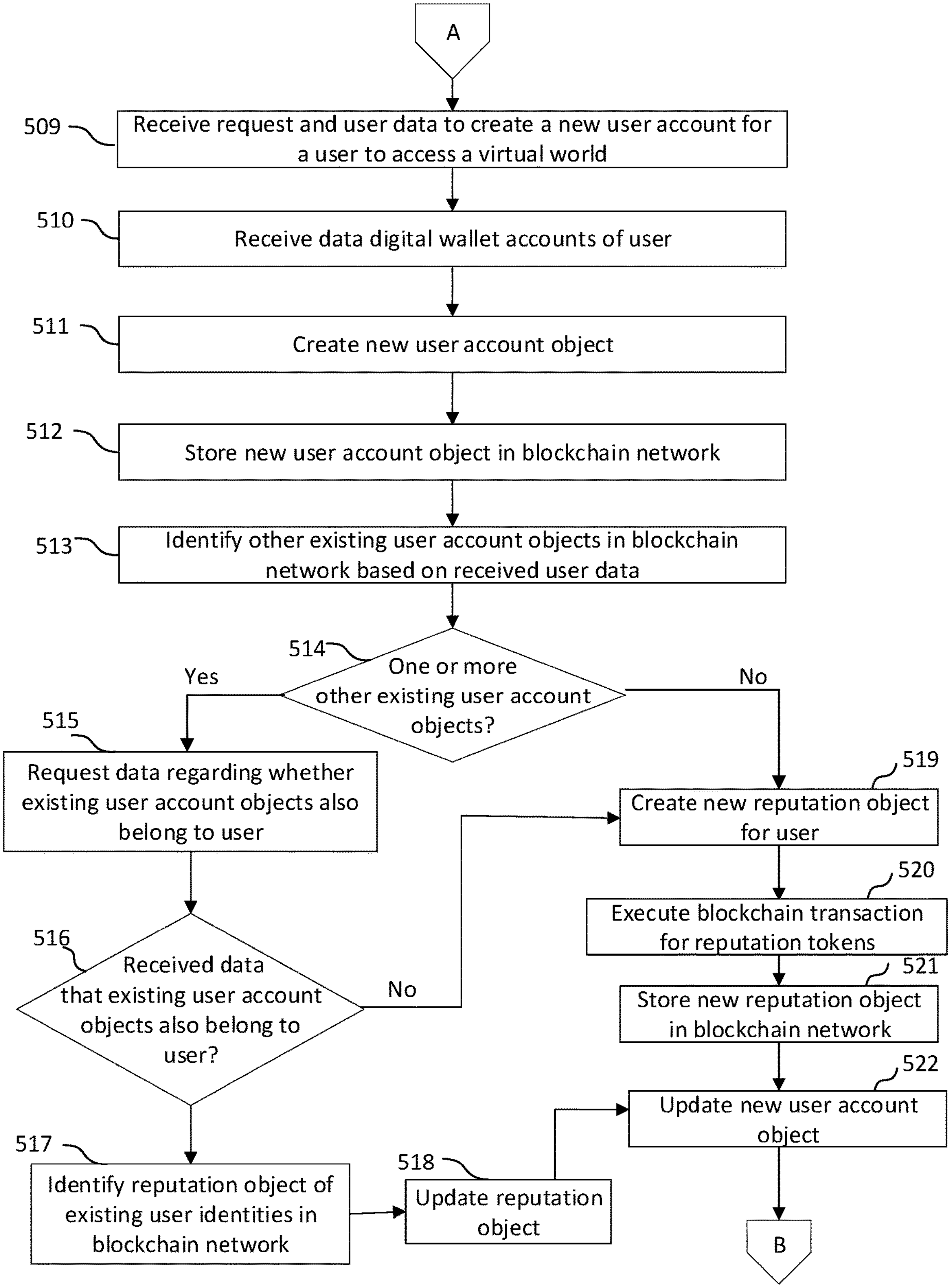

Steps 509-522 of FIG. 5B may relate to creating a user account object (e.g., the user account object 440) and a reputation account object (e.g., the reputation account object 460) for a user to access and interact with a virtual world. At step 509 in FIG. 5B, a request may be received for a new user account of a user to access and/or perform activities in a virtual world. The request may be received from a user device associated with the user or the virtual world. The request may further comprise user data of the user, such as a first name, a last name, email addresses, home addresses, work address, credit card information, banking information, personal website, phone number, MAC addresses or IP addresses of the user device, and/or other user data.

At step 510, data may be received about one or more digital wallet accounts of the user of step 509. The data received at step 510 may also comprise encryption keys (e.g., public keys) and/or blockchain addresses associated with the user of step 509.

At step 511, a new user account object (e.g., the user account object 440) may be created based on the data received at steps 509 and/or 510. The new user account object (e.g., the user account object 440) may comprises an identifier (e.g., the virtual world object identifier 442) for the virtual world that will be accessed by the user using the new user account object. The new user account object may further comprise contact information (e.g., contact information 445) for the user. Additionally, or alternatively, the user data received at step 509 may be stored in the reputation management server 300 (e.g., in database 338 for storing user data) and/or other servers (e.g., servers in the local office 103 or outside the local office 102), and the new user account object may store identifiers (e.g., hashes, database identifiers, any identifiers of alphanumeric characters, etc.) and/or addresses (e.g., web links, IP address, MAC address) for the stored user data in the servers.

Additionally, data received at step 510 may be stored as the data for digital wallets 446 in the new user account object. At step 512, the new user account object of step 511 may be stored in one or more blockchain networks by sending the user account object of step 511 to nodes of the blockchain networks. The blockchain network nodes may store the user account object of step 511 similarly to the nodes storing the new virtual world object in step 508 of FIG. 5A.

At step 513, one or more other existing user account objects (e.g., the user account object 440) that are related to the user of step 509 may be identified from the one or more blockchain networks. Identifying the existing user account objects may include traversing the blocks (e.g., the blocks 400A-D) of the one or more blockchain networks, identifying user account objects (e.g., the user account objects 440) stored in data blocks (e.g., the data block 406) of the blocks, and comparing the contact information for users (e.g., the contact information 445) in the user account objects with the user data received at step 509.

Also, or alternatively, identifying the existing user account objects may comprise generating hashes of the user data received at step 509. For example, separate hashes may be generated from the name, the email address, the residential address, the phone number, and/or other user data received at step 509. Additionally, or alternatively, a hash may be generated from all the user data received at step 509 or the new user account object generated at step 511. The generated hashes may be compared with hashes stored in the user account objects (e.g., the user account objects 440) in the blocks (e.g., the blocks 400A-D) of the one or more blockchain networks. If the generated hashes match wholly or partially with hashes stored in a user account object, that user account object may be determined to be an existing user account object associated with the new user account object of step 511.

Figure 6:
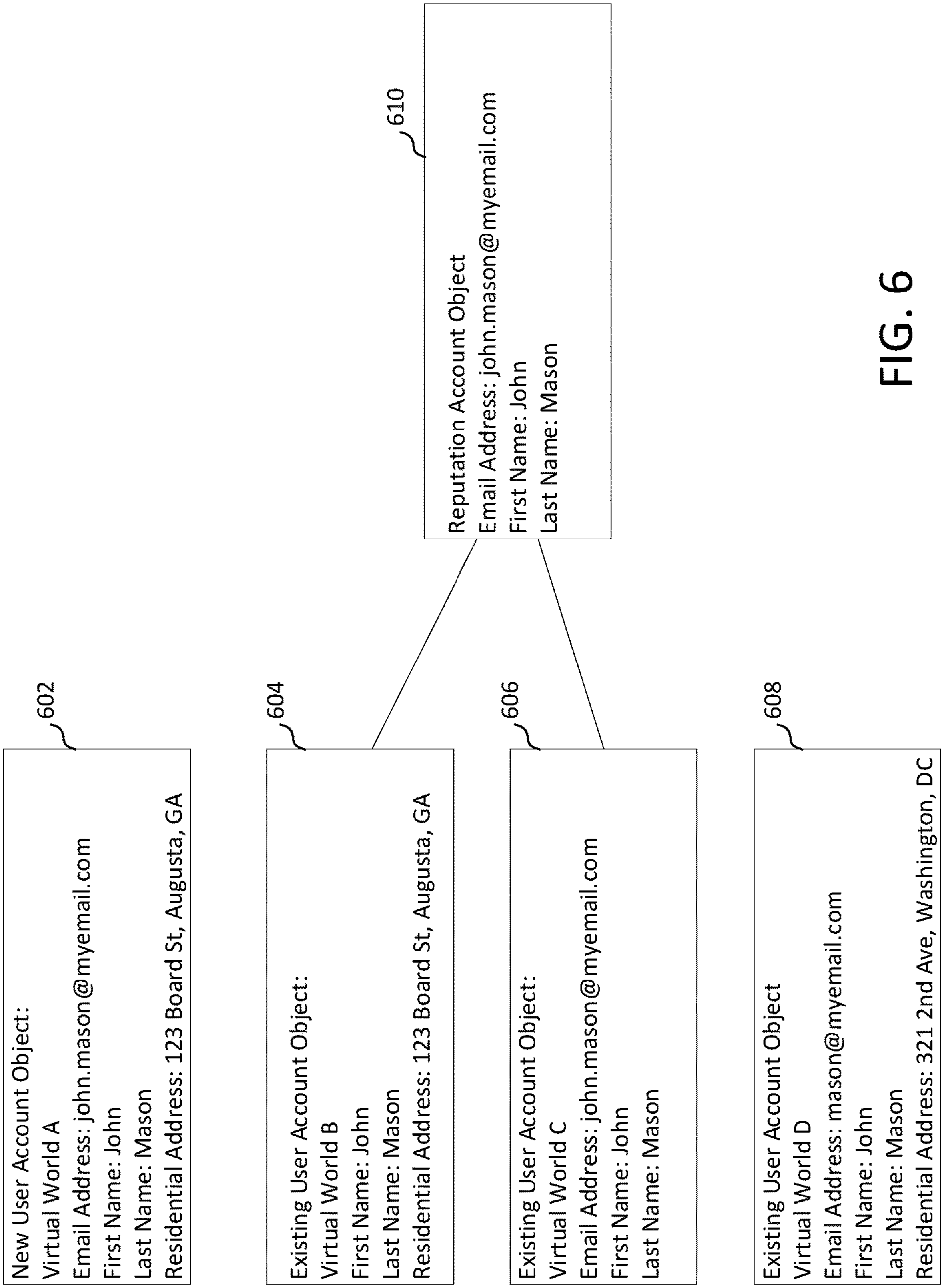
FIG. 6 shows example user account objects associated with the same user.

At step 514, it may be determined whether one or more existing user account objects were identified from one or more blockchain networks that may belong to the same user of step 509. For example, FIG. 6 shows a new user identity object 602 created for John Mason for the virtual world A with the email address "john.mason@gmail.com" and residential address of "123 Board St, Augusta, GA." Traversing the one or more blockchain networks may identify other existing user account objects, such as the user account object 604 for the virtual world B and the user account object 606 for the virtual world C. Both the existing user account objects 604 and 606 may store the same first name, the same last name, and/or the same email address as the new user account object 602. Conversely, another existing user account object 608 for the virtual world D may have the same first and last names but a different email and residential address than the new user account object 602. Therefore, it may be determined that the new user account object 602 and the existing user objects 604 and 606 are associated with the same user.

At step 515, if one or more existing user account objects are identified from the one or more blockchain networks (e.g., existing user objects 604 and 606), a message may be sent to the user requesting information about whether the identified existing user account objects are associated with the user. For example, a user interface may be outputted at a user device of the user with information about the existing user account objects with an option to select that the information is accurate.

At step 516, if data is received from the user that the identified existing user account objects (e.g., existing user objects 604 and 606) are not associated with the user, step 519 may be performed. At step 519, a new reputation account object (e.g., the reputation account object 460) may be created for the user of step 509 based on the data received at steps 509 and/or 510. The new reputation account object may include contact information (e.g., contact information 468) for the user. The data received at step 510 may be stored as the data for digital wallets 464 in the new reputation account object. Additionally, the new reputation account object may be linked to the new user account object of step 511 (e.g., by storing an identifier for the new user account object of step 511 in the new reputation object of step 519 in the identifier of user account objects 467).

At step 520, a blockchain transaction may be executed to transfer a pre-determined quantity of reputation objects to a blockchain address of the user (e.g., 650 reputation tokens or 700 reputation tokens). The new reputation account object of step 519 may be updated to reflect that the user is now associated with the pre-determined quantity of reputation tokens. Executing the blockchain transaction may comprise communicating with a digital wallet service and requesting the performance of the blockchain transaction. The reputation management server 300 may have an account with the digital wallet service (e.g., information about the account may be stored in the database 336 for digital wallets). The digital wallet service may create a blockchain transaction and send the blockchain transaction to the nodes of one or more blockchain networks for validation and addition of the blockchain transaction to the blockchains maintained by the nodes of the one or more blockchain networks.

Figures 7, 8A, 8B:
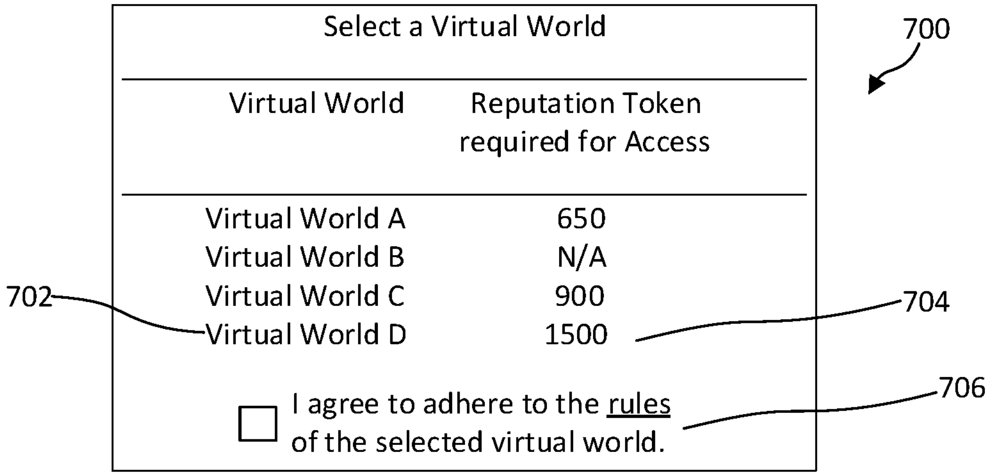

FIG. 8A shows an example blockchain transaction 800, where a quantity of reputation tokens may be transferred to a user with a new reputation account (e.g., the reputation account object 460 of step 519). The blockchain transaction 800 may include a blockchain address 802 associated with the user, an identifier 804 for a reputation object account created for the user, a timestamp 806 to record the time and date the blockchain transaction was completed, and the amount and type of tokens transferred 808 to the blockchain address 802 associated with the user with the new reputation account. While FIG. 8A shows 650 reputation tokens being transferred to the blockchain address 802, any quantity of reputation tokens may be transferred during the creation of the new reputation account object. The blockchain transaction 800 may also include other components which are not shown in FIG. 8A, such as a header indicating that the blockchain transaction 800 is transferring reputation tokens to a new reputation account, nonce, balance of reputation tokens and/or fungible tokens of the user, public keys associated with the user, etc.

At step 521, the new reputation account object of step 519 may be stored in one or more blockchain networks. At step 522, the new user account object of step 511 may be updated to link the new user account object of step 511 to the reputation account object of the user (e.g., by storing an identifier 443 for the reputation account object in the user account object 440).

At step 516, if data is received from the user that the identified existing user account objects are associated with the user, step 517 may be performed. At step 517, a reputation account object associated with the existing user account objects may be identified (e.g., identified by the identifier for reputation account object 443 in the existing user account objects). For example, as shown in FIG. 6, the existing user account objects 604 and 606 may comprise an identifier for the reputation account object 610. At step 518, the identified reputation account object of step 517 may be updated to link the identified reputation account object of step 517 to the new user account object of step 511 (e.g., by storing an identifier for the new user account object of step 511 in the identified reputation object of step 517 in the identifier of user account objects 467). At step 522, the new user account object of step 511 may be updated to link the new user account object of step 511 to the exiting reputation account object identified at step 517 (e.g., by storing an identifier 443 for the reputation account object in the new user account object).

Figure 5C:
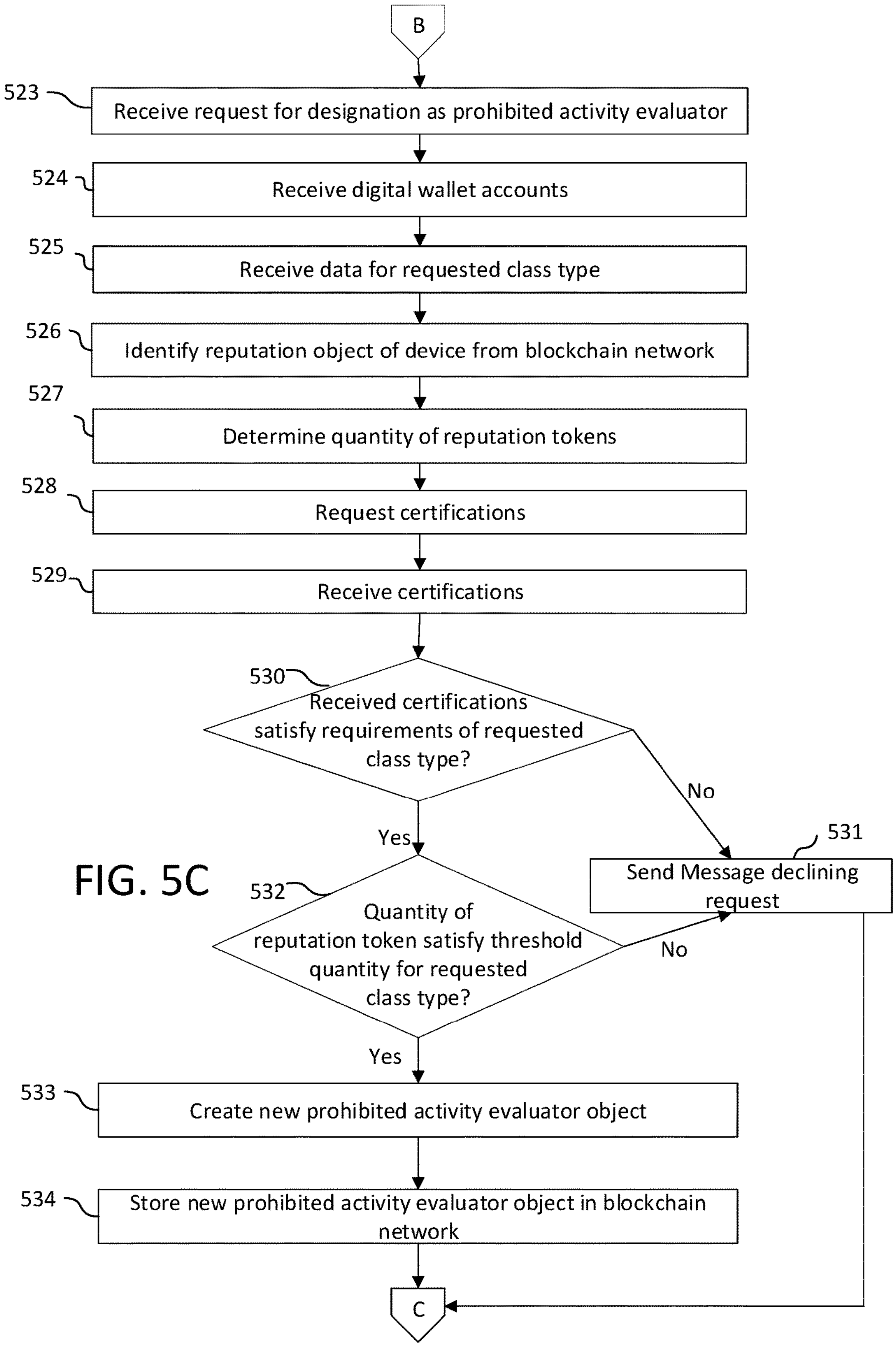

Steps 523-534 of FIG. 5C relate to registering a new prohibited activity evaluator. The new prohibited activity evaluator may be a user, a user device, or a node of a network of nodes of a blockchain network. Registering the new prohibited activity evaluator may further comprise downloading of a software installation package by the new prohibited activity evaluator (or by a device associated with the new prohibited activity evaluator), installing of the software installation package by the new prohibited activity evaluator (or by a device associated with the new prohibited activity evaluator), and configuring the new prohibited activity evaluator (or by a device associated with the new prohibited activity evaluator) to determine whether users have performed any prohibited activities in virtual worlds based on rules and/or rulebooks (e.g., the rulebook for access 425, the general rulebook for prohibited activities 423, and/or location-based rulebook for prohibited activities 424) provided by the virtual worlds.

At step 523, a request may be received from a user or a device (e.g., a device from the premises 102, a mobile device 125, a node from the internal blockchain network 134 or the external blockchain networks 138, or another computing device) to be designated as a new prohibited activity evaluator. At step 524, data may be received about one or more digital wallet accounts of the user or the device of step 523. The data received at step 524 may also comprise public keys associated with the user or the device and/or blockchain addresses of the user or the device. The user of device of step 523 may be designated as a prohibited activity evaluator of different class types. For example, users or devices designated as prohibited activity evaluators of class type A may initially review user activities of a user to determine whether the user has performed a prohibited activity and/or violated one of the rules of a virtual world. Users or devices designated as prohibited activity evaluators of class type B may review the decisions of the prohibited activity evaluators of class type A and may affirm or reverse the decisions. Additionally, users or devices designated as prohibited activity evaluators of class type B may review user activities that were declined to be reviewed by multiple devices designated as prohibited activity evaluators of class type A. At step 525, data may be received about a class type requested by the user or device of step 523. The data may indicate that the user or device of step 523 is requesting to be designated as either a prohibited activity evaluator of class type A or class type B.

At step 526, a reputation account object (e.g., the reputation account object 460) associated with the user or device of step 523 may be determined from one or more blockchain networks. Identifying the reputation account object may include receiving information about a user account data object (e.g., the user account object 440), determining an identifier (e.g., identifier 443) for a reputation account object linked to the user account data object, and traversing blocks (e.g., the blocks 400A-D) of the one or more blockchain networks to identify the reputation account object stored in one or more of the blocks (e.g., the data blocks 406A-D) of the one or more blockchain networks by using the identifier (e.g., identifier 443) for the reputation account object as the address for the reputation account object in the one or more blockchain networks. At step 527, a quantity of reputation tokens associated with the user or device of step 523 may be determined from the reputation object of step 526 (e.g., based on the reputation token balance 463 in the reputation account object). As an alternative to steps 526 and 528, the quantity of reputation tokens associated with the user or device of step 523 may be determined by communicating with digital wallet services and determining the quantity of reputation tokens associated with a blockchain address of the user or device of step 523.

At step 528, one or more certifications may be requested for the user or device of step 523 to be designated as a prohibited activity evaluator. The certifications may be requested from the user or device of step 523, the virtual worlds, government organizations, organizations associated with regulating online activities, and/or other organizations. The certifications may represent permission for the user or device of step 523 to be designated as a prohibited activity evaluator and/or training received by the user or device of step 523 to determine whether users have performed prohibited activities. At step 529, one or more certifications may be received.

At step 530, it may be determined whether the received certifications of step 529 satisfy the requirements of the class type requested by the user or device of step 523. For example, class type A may require level I certifications from an organization that regulates online activities. Additionally, a class type B may require level II certifications from the organization. As another example, while class type A may not require any certifications from a virtual world, class type B may require them. If it is determined at step 530 that the received certifications of step 529 do not satisfy the requirements of the class type requested by the user or device of step 523, a message may be sent to the user or device of step 523 declining the request of step 523 to designate the user or device of step 523 as a prohibited activity evaluator. Otherwise, step 532 may be performed.

At step 532, it may be determined whether a quantity of reputation tokens associated with the user or device of step 523 satisfies a threshold quantity required for the class type requested by the device. For example, the class type A may require the user or device of step 523 to be associated with 800 reputation tokens, while the class type B may require the user or device of step 523 to be associated with 1500 reputation tokens. If it is determined at step 532 that the quantity of reputation tokens associated with the user or device of step 523 does not satisfy the threshold quantity required for the class type requested by the user or device of step 523, a message may be sent to the user or device of step 523 declining the request of step 523 to be designated as a prohibited activity evaluator. Otherwise, step 533 may be performed.

At step 533, a new prohibited activity evaluator object (e.g., the prohibited activity evaluator object 470) may be created based on the data received at steps 524, 525, 526, and/or 529 for the user or device of step 523. For example, the new prohibited activity evaluator object may include data received at step 524 about digital wallet accounts the user or device of step 523 has with digital wallet services, blockchain addresses, and/or public keys of the device of step 523 (e.g., as the data for digital wallets 475), the class type requested at step 525 (e.g., as the prohibited activity evaluator class type 472), the quantity of reputation tokens associated with the user or device of step 523 (e.g., as reputation token balance 474), certifications received at step 529 (e.g., as certification data 477), and/or other data.

At step 534, the new prohibited activity evaluator object of step 533 may be stored in one or more blockchain networks. Storing the new prohibited activity evaluator object of step 533 may comprise sending the new prohibited activity evaluator object to nodes of the one or more blockchain networks to add the new prohibited activity evaluator object of step 533 to one or more data blocks (e.g., data block 406) of one or more new blocks or one or more existing blocks (e.g., the blocks 400A-D) of the blockchain networks.

Figure 5D:
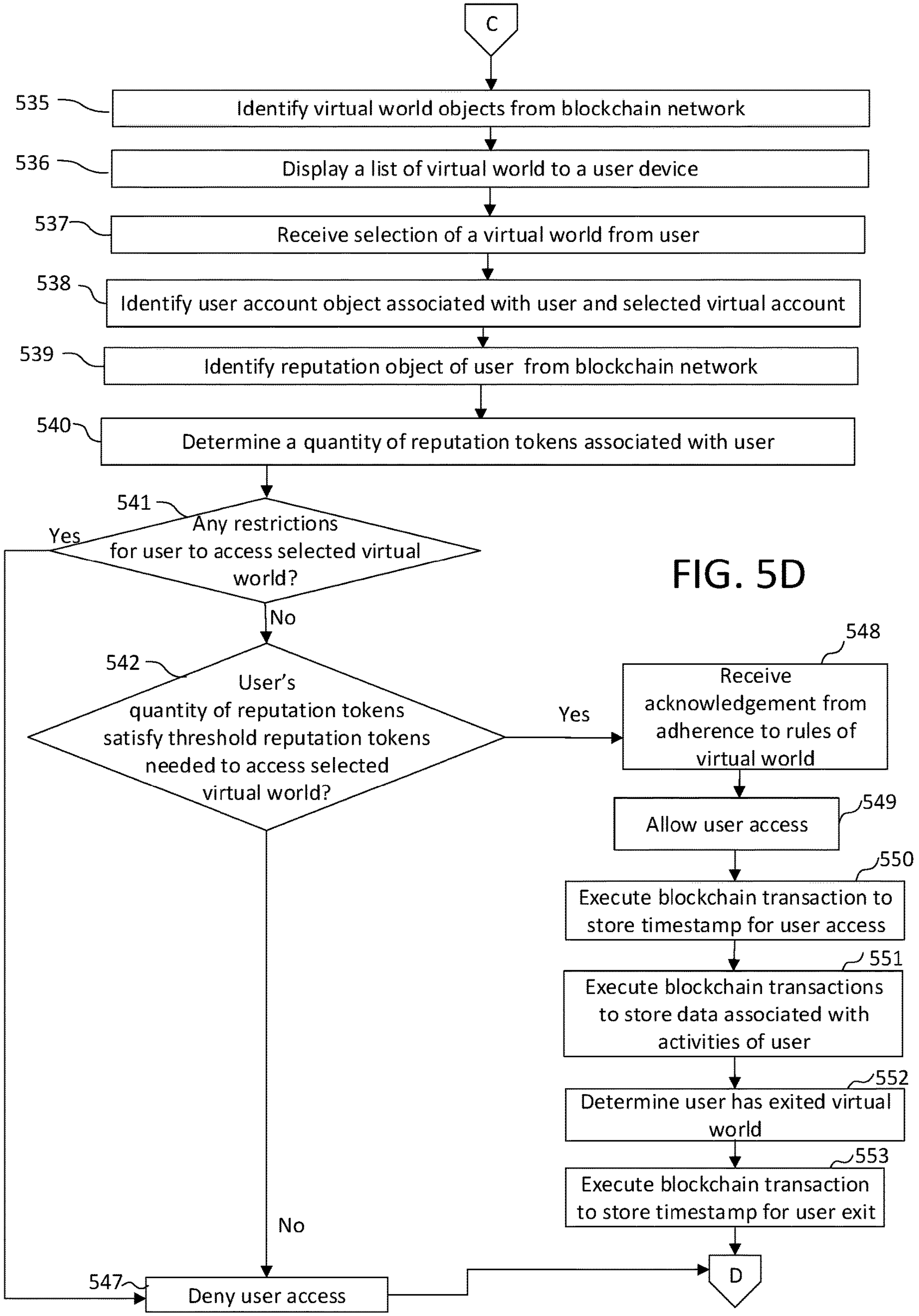

Steps 535-553 of FIG. 5D relate to a user requesting access to a virtual world. At step 535, one or more virtual world objects (e.g., virtual world objects 420) may be identified from one or more blockchain networks. Identifying the virtual world objects may comprise traversing the blocks (e.g., blocks 400A, 400B, 400C, 400D) of the one or more blockchain networks to identify virtual world objects stored in the data blocks (e.g., the data block 406) of the blocks. At step 536, information about virtual worlds associated with the virtual world objects identified at step 535 may be displayed to a user via a user device as a list. For example, FIG. 7 shows an example user interface 700 that may be displayed via the user device. The user interface 700 may include a list of virtual worlds 702. The list of virtual worlds 702 may list virtual worlds that require reputation tokens for user access, virtual worlds that do not require reputation tokens for user access, and/or other virtual worlds. Additionally, the user interface 700 may also display a threshold quantity of reputation tokens 704 needed to access a virtual world from the list of virtual worlds 702. For example, the virtual world A may require a user to have at least 650 reputation tokens to gain access to the virtual world A, the virtual world C may require a user to have at least 900 reputation tokens to gain access to the virtual world C, and the virtual world D may require a user to have at least 1500 reputation tokens to gain access to the virtual world D. The virtual world B may not require a minimum quantity of reputation tokens, and may allow any user to access the virtual world B. In some examples, the user interface 700 may only list virtual worlds that the user can access with the quantity of reputation tokens currently available for the user. For example, for a user with 700 tokens, the user interface may only display a list 702 comprising the virtual world A and the virtual world B. The user interface 700 may ask for a selection of a virtual world from the list of virtual worlds 702, and at step 537, data about the selection may be received from the user of step 536. In other examples, the user interface 700 may only list virtual worlds but not indicate the threshold quantities of reputation tokens needed to access the virtual worlds.

At step 538, a user account object (e.g., the user account object 440) associated with the user of step 536 and the selected virtual world of step 537 may be determined from one or more blockchain networks. For example, along with the selection of the virtual world at step 537, information and/or an address (e.g., user account object identifier 411) of the user account object (e.g., the user account object 440) that will be used by the user of step 536 to access the selected virtual world may be received, and the information and/or address may be used to identify the user account object from the one or more blockchain networks. At step 539, a reputation account object (e.g., the reputation account object 460) associated with the user of step 536 may be determined from the one or more blockchain networks. The address (e.g., the identifier for the reputation account object 443) for the reputation account object linked to the user account object may be identified from the user account object identified at step 538, and the address may be used to identify the reputation account object from the one or more blockchain networks. At step 540, a quantity of reputation tokens associated with the user of step 536 may be determined from the reputation object of step 539 (e.g., based on the reputation token balance 463 in the reputation account object).

At step 541, it may be determined whether there is any restriction for the user of step 536 to access the selected virtual world of step 537. For example, the identified reputation account object of step 538 may indicate (e.g., based on restrictions 469 in the reputation account object 400) whether the user of step 536 is currently banned from accessing the selected virtual world of step 537 and/or all virtual worlds. If there is a restriction for the user of step 536 to access the selected virtual world of step 537, at step 547, access to the selected virtual world of step 537 for the user of step 536 may be denied. Otherwise, step 542 may be performed.

At step 542, it is determined whether the quantity of reputation tokens of the user of step 536 satisfies the threshold quantity of reputation tokens needed to access the selected virtual world of step 537. For example, if the user of step 536 has 700 reputation tokens and selects virtual world A from the user interface 700 in FIG. 7, the user of step 536 may be able to satisfy the 650 threshold reputation token quantity required to access the virtual world A. If the user of step 536 selects virtual world C from the user interface 700 in FIG. 7, the user of step 536 may not be able to satisfy the 700 threshold reputation token quantity required to access the virtual world B. If it is determined that the quantity of reputation tokens of the user of step 536 satisfy the threshold reputation token quantity needed to access the selected virtual world of step 537, step 548 may be performed. Otherwise, step 547 may be performed where access to the selected virtual world of step 537 for the user of step 536 may be denied Before granting the user access to the selected virtual world, an option (e.g., the option 706 in FIG. 7) may be displayed, via the user device associated with the user of step 536, requesting an acknowledgment that the user of step 536 will adhere to the rules (e.g., rules in the rulebook for access 425, the general rulebook for prohibited activities 423, and/or location-based rulebook for prohibited activities 424) of the selected virtual world. The option may comprise a link to a website storing the rules of the selected virtual world. At step 548, acknowledgment from the user of step 536 may be received that the user of step 536 will adhere to the rules of the selected virtual world.

At step 549, the user of step 536 may be allowed to access the selected virtual world. After the user of step 536 is allowed to access the selected virtual world, at step 550, a blockchain transaction may be executed to store a timestamp indicating when the user of step 536 started accessing or interacting with the virtual world. FIG. 8B shows an example blockchain transaction 830 that records when a user was granted access to the selected virtual world and/or when the user started accessing or interacting with the selected virtual world. The blockchain transaction 830 may include an identifier 832 for a virtual world object associated with the selected virtual world, an identifier 804 for a reputation object account of the user, an identifier 816 for a user account object used by the user to access the selected virtual world, and/or an access timestamp 834 indicating when the user started accessing or interacting with the virtual world. The blockchain transaction 830 may include other data, such as a header indicating that the blockchain transaction 830 is recording the time and date the user has started accessing the selected virtual world. The blockchain transaction 830 may be distributed across the nodes of the one or more blockchain networks.

At step 551, multiple blockchain executions may be executed to store data about activities performed by the user of step 536 (e.g., posts, actions in games, blogs, motions, and/or other user activities in the virtual environments) in one or more blockchain networks. The data by the blockchain executions of step 551 may be used to determine (e.g., by prohibited activity evaluators, by the reputation management server 122, and/or the reputation management server 300) whether the user of step 536 has performed any prohibited activities. FIG. 8C shows an example blockchain transaction 840 that may store user activity data 842. The user activity data 842 may be in the form of videos, audio, texts, graphics, pictures, websites, snapshots of a virtual environment, and/or other representations of user activities. Additionally, blockchain transaction 840 may include a header indicating that the blockchain transaction 840 is storing data about user activities. The blockchain transaction 840 may be distributed across multiple nodes of the one or more blockchain networks.

At step 552, it may be determined that the user of step 536 has exited the virtual world, or stopped interacting or traversing the virtual world. At step 553, a blockchain transaction (e.g., the blockchain transaction 850) may be executed to store a timestamp indicating the user's exit from the virtual world. FIG. 8D shows an example blockchain transaction 850 that comprises an exit timestamp 828, indicating when the user stopped accessing the virtual world. The blockchain transaction 850 may be distributed across nodes of the one or more blockchain networks.

Figure 5E:
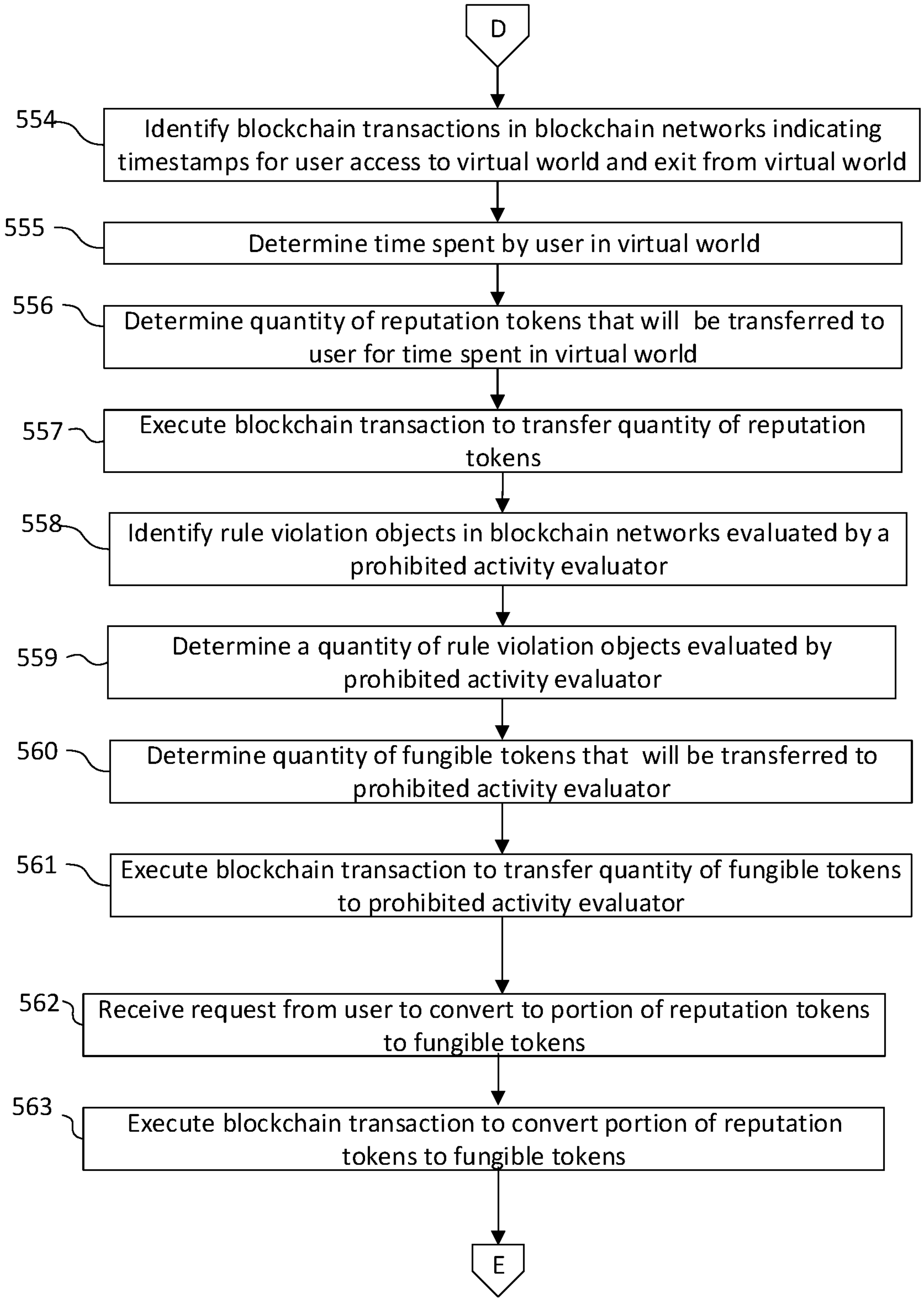

Steps 554-563 of FIG. 5E relate to other blockchain transactions that may be stored in one or more blockchain networks. At step 554, blockchain transactions comprising timestamps when a user started accessing or interacting with a virtual world (e.g., blockchain transaction 830 with access timestamp 834) and/or exited the virtual world (e.g., blockchain transaction 850 with exit timestamp 853) may be identified by traversing one or more data blocks (e.g., data block 406) of one or more blocks (e.g., blocks 400A-D) of the one or more blockchain networks. Based on the blockchain transactions identified at step 554, time spent by the user in the virtual world may be determined at step 555. For example, the timestamps in blockchain transactions 830 and 850 indicate that the user has spent 50 hours in the virtual world. At step 556, a quantity of reputation tokens that will be transferred to a blockchain address of the user may be determined based on time spent by the user in the virtual world. The quantity of reputation tokens to be transferred may be based on a rate, such as one reputation token being transferred for every 50 hours spent in the virtual world. Alternate rates may include transferring one reputation token for every 20, 100, or 200 hours spent in a virtual world. At step 557, a blockchain transaction (e.g., similar to the blockchain transaction 800 but with a different number of reputation tokens in the transaction data 808) may be executed to transfer the quantity of reputation tokens determined at step 556 to a blockchain address of the user. The blockchain transaction of step 557 may be distributed to blockchain nodes of the one or more blockchain networks.

At step 558, the one or more blockchain networks may be traversed to identify rule violation objects (e.g., rule violation objects 480) that have been reviewed by a prohibited activity evaluator (e.g., a mobile device 132, a device in the premises 102, a node in a blockchain network, and/or other devices designated as a prohibited activity evaluator). The identified rule violation objects may be associated with prohibited activities performed by one user or multiple users. An identifier for the prohibited activity evaluator (e.g., prohibited activity evaluator object identifier 471) may be saved with the decisions (e.g., in decision & prohibited activity evaluator data 488) of the rule violation objects. A quantity of rule violation objects evaluated by the prohibited activity evaluator may be determined at step 559. Alternatively, a prohibited activity evaluator object (e.g., a prohibited activity evaluator object 470) may store information (e.g., in the evaluation data 478) about the quantity of rule violation objects evaluated by the prohibited activity evaluator. At step 560, a quantity of fungible tokens may be determined for the prohibited activity evaluator for reviewing the identified rule violation objects of step 588. At step 561, the quantity of fungible tokens of step 560 may be transferred to a blockchain address of the prohibited activity evaluator. A number of fungible tokens may be transferred for a certain quantity of rule violation objects evaluated by the prohibited activity evaluators. For example, fifty fungible tokens may be transferred for every twenty evaluations the prohibited activity evaluator performs. FIG. 8E shows an example blockchain transaction 860 where the transaction data 862 may indicate that fifty fungible tokens are transferred to a blockchain address 861 of the prohibited activity evaluator. The example transaction 860 may also comprise a timestamp 806, indicating the time and date the blockchain transaction 860 was executed.

At step 562, a request may be received from a user (e.g., via the mobile devices 125, the devices in premises 102, and/or other user devices) to convert a portion of the reputation tokens associated with the user to cryptocurrency or to another type of fungible tokens. Additionally, it may be determined whether the user of step 562 has permission to convert the reputation tokens associated with (e.g., owned) by the user of step 562 to cryptocurrency or to another type of fungible tokens. For example, users with new user account objects (e.g., user account objects created less than two years) or users with less than a threshold quantity of reputation tokens (e.g., less than 1000 or 1500 reputation tokens) may be prohibited from converting reputation tokens to cryptocurrency or to another type of fungible token. If the user of step 562 does not have permission to convert reputation tokens, the request of step 562 may be denied. Otherwise, step 563 may be performed where a blockchain transaction may be executed to convert a portion of the user's reputation tokens (e.g., a portion may be specified by the user at step 562) to cryptocurrency or to another type of fungible tokens. The blockchain transaction of step 563 may be distributed to blockchain nodes of the one or more blockchain networks.

Figure 5F:
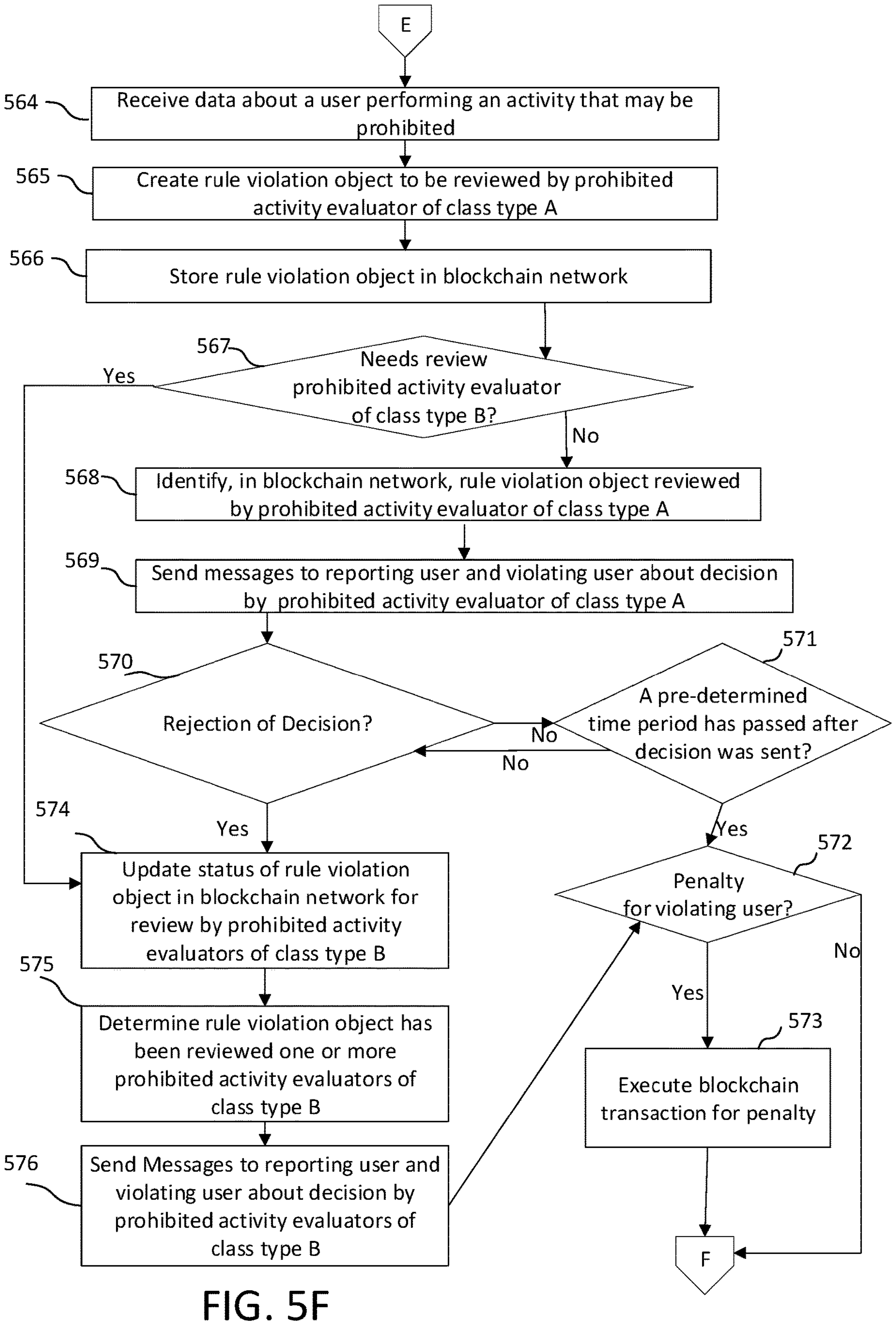

Steps 564-576 of FIG. 5F relate to a process where it is determined whether a user has performed a prohibited activity in a virtual world. At step 564, data may be received about the user performing an activity in the virtual world that may be prohibited or violates one or more rules of the rulebooks (e.g., the general rulebook for prohibited activities 423 and/or location-based rulebook for prohibited activities 424) of the virtual world. The data may be received from another user that may have reported the activity. Additionally, or alternatively, the reputation management server 300 and/or one or more nodes in one or more blockchain networks may traverse through blocks (e.g., blocks 400A-D) to find blockchain transactions (e.g., blockchain transaction 840) storing user activity data (e.g., the user activity data 842). The user activity data (e.g., the user activity data 842) may be analyzed by machine learning-based models hosted by the reputation management server 300 and/or the nodes of the one or more blockchain networks. Examples of machine learning-based models include natural language processing, regression-based models, neural network-based models, and/or fully-connected network-based models. For example, user activity data (e.g., the user activity data 842) may store a video of an avatar associated with the user performing various activities in a virtual world. Objects (e.g., avatars associated with the user, other avatars, virtual properties surrounding the avatars, etc.) depicted in the video streams by the machine learning-based models may be determined based on an analysis of the video frames. Motions of the objects in the video may be tracked from one video frame to another. For example, in an online 3-D video game, the machine learning-based models may be able to identify the various avatars associated with the users, any virtual properties, characters in the game, and/or other objects. The machine learning-based models may be configured to identify specific events or behaviors of the objects in the video streams, such as an avatar attacking another avatar. The machine learning-based models may analyze the videos to determine whether any activity was performed in the video that may be prohibited. Additionally, machine learning-based models may analyze posted photos and/or texts to see if the photos and/or text may violate one or more rules of the virtual world (e.g., post spreading false information, showing copyright photos, altering a photo to spread false information, etc.).

At step 565, a rule violation object (e.g., the rule violation object 480) may be created. The status (e.g., the status 482) of the rule violation object may be set to "needs review by prohibited activity evaluation of class type A." If another user has provided the data at step 564, a user account object identifier (e.g., the user account object identifier 441) associated with the other user may be stored in the rule violation object (e.g., in the user account object identifier for reporting user 483). Additionally, the rule violation object of 565 may also store a user account object identifier (e.g., the user account object identifier 441) associated with the user that may have potentially performed a prohibited activity in the rule violation object (e.g., as the user account object identifier for violating user 484), a virtual world object identifier (e.g., the virtual world object identifier for the virtual world 422) for the virtual world where the activity happened (e.g., as the virtual world object identifier 485), rules 486 that may have been violated, and/or data 487 that will act as evidence (e.g., data may be provided by reporting user and/or the data identified by machine learning models from blockchain transactions 840 storing user activity data 842). At step 566, the rule violation object of step 565 may be stored in one or more blockchain networks by broadcasting the rule violation object to nodes of the one or more blockchain networks.

At step 567, a rule violation object of step 565 may be identified from one or more blockchain networks, and it may be determined whether the rule violation object needs review from prohibited activity evaluator of class type B, instead of review by a prohibited activity evaluator of class type A. For example, the identified rule violation object may store data (e.g., decisions and prohibited activity evaluator data 488) that a quantity of prohibited activity evaluators of class type A (e.g., five, ten, twenty, and so on) have declined to review the rule violation object. In other examples, it may be determined that the rule violation object has been present in the one or more blockchain networks for more than a threshold time period (e.g., two weeks, a month, two months, etc.) and is yet to be reviewed by a prohibited activity evaluator of class type A. In such examples, it may be determined that the rule violation object may need a review from a prohibited activity evaluator of class type B. If a review by a prohibited activity evaluator of class type B is not needed, step 568 may be performed. Otherwise, step 572 may be performed.

If a review by a prohibited activity evaluator of class type B is not needed, at step 568, a rule violation object (e.g., the rule violation object of step 561, the rule violation object 480) that has been reviewed by a prohibited activity evaluator of class type A, may be identified from one or more blockchain networks. For example, the identified rule violation object of step 568 may comprise a status (e.g., the status 482) that the rule violation object was reviewed by a prohibited activity evaluator of class type A. Additionally, or alternatively, the identified rule violation object of step 568 may comprise a decision made by the prohibited activity evaluator of class type A (e.g., stored in the decision and prohibited activity evaluator data 488 along with prohibited activity evaluator object identifier of the prohibited activity evaluator of class type A). The decision by the prohibited activity evaluator of class type A may indicate that the user has performed a prohibited activity that violated one or more rules of the rulebooks (e.g., the general rulebook for prohibited activities 423 and/or location-based rulebook for prohibited activities 424) of a virtual world. Alternatively, the decision may indicate that there were no rule violations. At 569, messages may be sent to the user (e.g., associated with the user account object identifier for violating user 484) via a use device of the user and/or to any user that reported the activity (e.g., associated with the user account object identifier for reporting user 483) about the decision based on the contact information available (e.g., the contact information 468) in user account objects (e.g., the user account object 460) of the users.

Figures 8F, 8G:
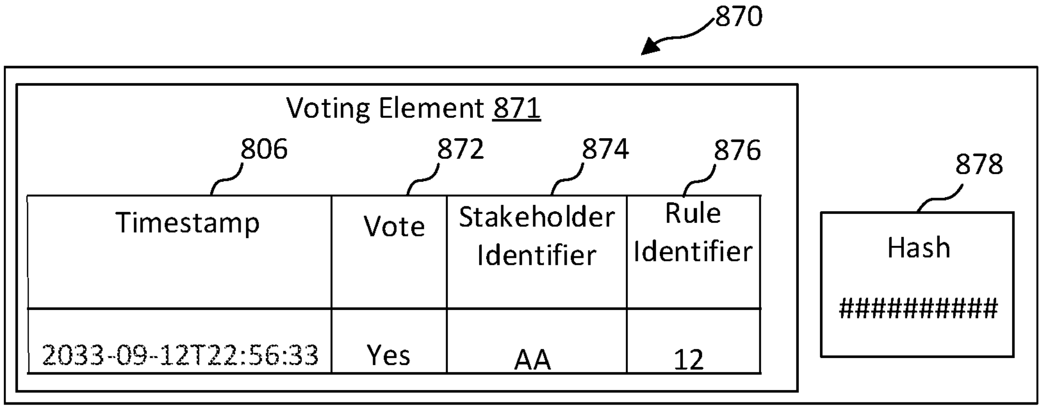

At step 570, it may be determined whether the decision was rejected. For example, if the decision indicates that a user has performed a prohibited activity that violated one or more rules of the rulebooks of a virtual world (e.g., the general rulebook for prohibited activities 423 and/or location-based rulebook for prohibited activities 424), the user, via his or her user device, may send a message rejecting the decision. As another example, the decision may indicate that there were no rule violations, and any user that reported the activity (e.g., associated with the user account object identifier for reporting user 483) may send a message rejecting the decision of no rule violation. If it is determined that the decision was not rejected, at step 571, it may be determined whether a predetermined time period (e.g., a week, two weeks, a month, etc.) has passed since the decision was sent at step 569. If a predetermined time period has not passed, then step 570 is performed again. If it is determined at step 571 that the predetermined time period has passed, it may be determined at step 572 whether there is any penalty for the user performing the prohibited activity. For example, the rule violation object (e.g., the rule violation object 480) associated with the prohibited activity may indicate that a quantity of reputation tokens of the user that has performed the prohibited activity will be penalized (e.g., penalty 489 stored in the rule violation object 480). The penalty may also include banning the user from accessing the virtual world (e.g., the virtual world associated with the virtual world object identifier 485), and the reputation account object (e.g., the reputation account object 461) associated with the user may be updated to store information about the ban (e.g., in restriction 469). As another example, step 572 may be performed after performing step 576 (described below). If it is determined that there is no penalty for the user (e.g., no penalty for a rule violation indicated in the rule violation object of step 568, or the decision was no rule was violated), step 577 of FIG. 5G may be performed. Otherwise, at step 573, a blockchain transaction may be executed to transfer reputation tokens away from a blockchain address of the user, and the blockchain transaction may be broadcasted to nodes of the one or more blockchain networks For example, FIG. 8F shows an example blockchain transaction 864 where the transaction data 868 indicates that ten reputation tokens are being deducted from a quantity of reputation tokens associated with a user with reputation account object identifier 804. The blockchain transaction 860 may include a blockchain address 802 associated with the user and/or a timestamp 808 to record the time and date the blockchain transaction was completed. After step 573, step 577 of FIG. 5G may be performed.

At step 570, if it is determined that the decision was rejected, the status (e.g., the status 482) may of the rule violation object of step 568 may be updated at step 574 such that the rule violation object needs review by prohibited activity evaluators of class type B. Afterwards, at step 575, it may be determined that the rule violation object of step 574 may have been reviewed by a prohibited activity evaluator of class type B. For example, the rule violation object of step 574 may comprise a status (e.g., the status 482) that the rule violation object was reviewed by a prohibited activity evaluator of class type B. Additionally, or alternately, the rule violation object of step 575 may comprise a decision made by one or more prohibited activity evaluators of class type B (e.g., stored in the decision and prohibited activity evaluator data 488 along with prohibited activity evaluator object identifier of the prohibited activity evaluator of class type B). The decision by the prohibited activity evaluator of class type A may indicate that the user has performed or not performed a prohibited activity that violated one or more rules of the rulebooks (e.g., the general rulebook for prohibited activities 423 and/or location-based rulebook for prohibited activities 424) of a virtual world and/or any previous decisions made by prohibited activity evaluator of class type A is affirmed by the prohibited activity evaluators of class type B. Alternatively, the decision by the prohibited activity evaluator of class type B may indicate that the decision by the prohibited activity evaluator of class type A was incorrect, and the decision of the prohibited activity evaluator of class type B may be opposite of that of the prohibited activity evaluator of class type A. At 576, messages may be sent to the user (e.g., associated with the user account object identifier for violating user 484) and/or to any user that reported the activity (e.g., associated with the user account object identifier for reporting user 483) about the decision of the prohibited activity evaluator of class type B based on the contact information available (e.g., the contact information 468) in user account objects (e.g., the user account object 460) of the users. Then step 572 may be performed to determine whether any penalty value is associated with the decision by the prohibited activity evaluators of class type B.

Figure 5G:
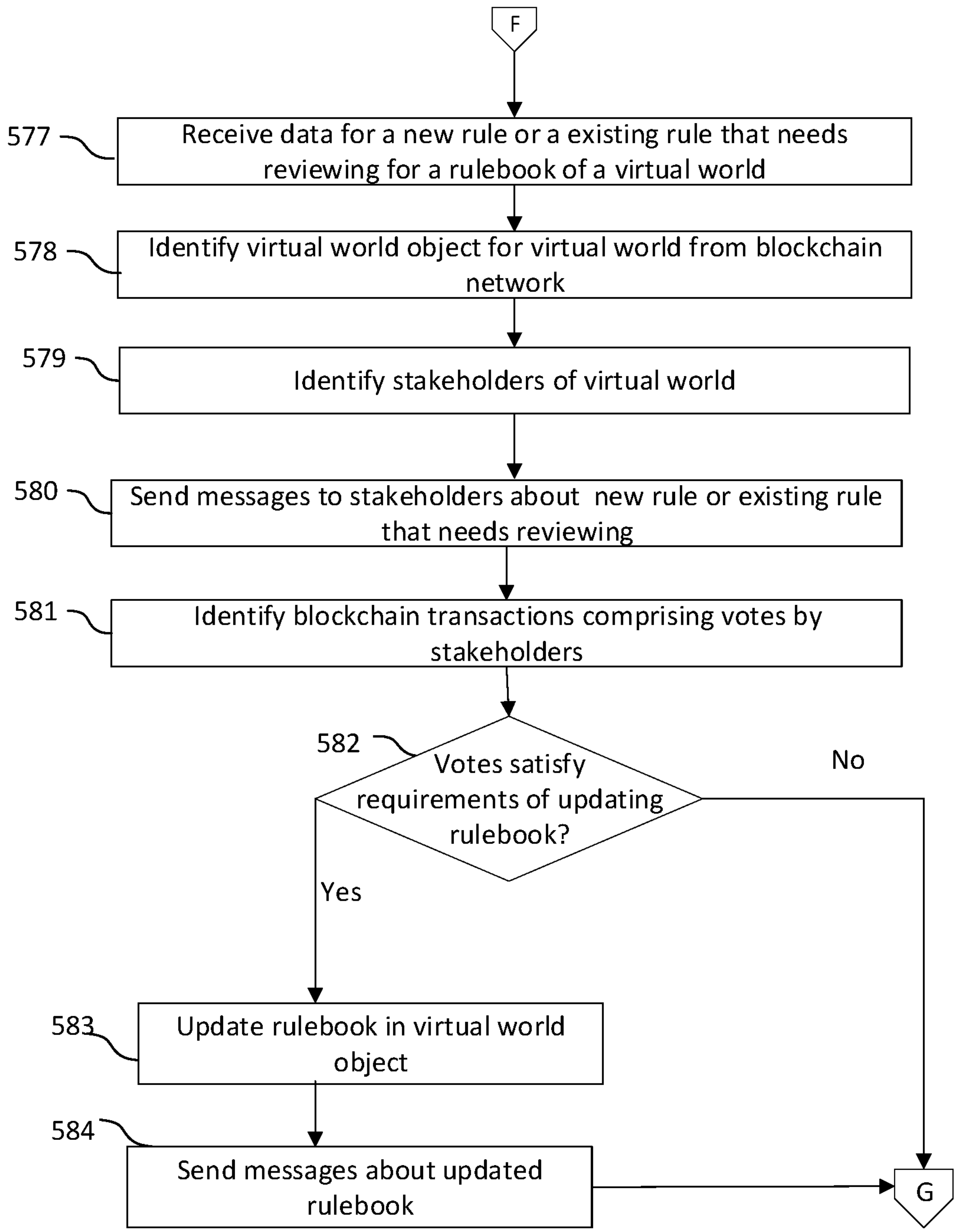

Sometimes, a virtual world may update its rulebooks (e.g., the rulebook for access 425, the general rulebook for prohibited activities 423, and/or location-based rulebook for prohibited activities 424) to add new rules. For example, a virtual world of a massively multiplayer online game may add a rule that destroying the virtual properties of other users is prohibited, and a user that destroys properties of other users may be penalized for fifty reputation tokens. Additionally, a user, a user device, nodes of one or more blockchain networks, stakeholders of the virtual world, and/or prohibited activity evaluators may also request new rules to be added. The virtual world may update an existing rule in its rulebooks (e.g., the rulebook for access 425, the general rulebook for prohibited activities 423, and/or the location-based rulebook for prohibited activities 424). For example, the rule that penalized users for destroying the virtual properties of other players of the massively multiplayer online game may be modified to include that if the user who destroyed the virtual property was running away from an avatar of another user who was attacking the avatar of the user, then the user may not be penalized. User, stakeholders, nodes of blockchain networks, and/or prohibited activity evaluators may also request existing rules be modified. Rules in the rulebooks (e.g., the rulebook for access 425, the general rulebook for prohibited activities 423, and/or the location-based rulebook for prohibited activities 424) may be removed from the rulebooks or canceled. For example, a virtual world may cancel or remove a rule prohibiting the spreading of false information. Steps 577-584 of FIG. 5G is related to a process where new rules are added and/or existing rules are modified or canceled in rulebooks of the virtual worlds.

At step 577, data may be received about a rule to be added to a rulebook (e.g., the rulebook for access 425, the general rulebook for prohibited activities 423, and/or location-based rulebook for prohibited activities 424) of a virtual world, and/or an existing rule to be modified or removed. The data may be received from a user via his or her user device, one or more nodes of one or more blockchain networks (, a stakeholder of the virtual world, and/or a prohibited activity evaluator. The request may comprise an identifier (e.g., virtual world object identifier) for a virtual world object (e.g., virtual world object 420) associated with the virtual world and/or a rule identifier for an existing rule. The data received at step 577 may indicate that each stakeholder of the virtual world may only have one opportunity to vote for the addition of the new rule, or the modification or cancelation of the existing rule. Additionally, or alternatively, the data received at step 577 may indicate a minimum percentage of votes required to approve the addition of the new rule or the modification or cancellation of the existing rule. For example, the data may indicate that 66% of the stakeholders have to vote yes to add the new rule to a rulebook of a virtual world, or cancel or modify the existing rule. In some examples, the data may request to calculate a score from the votes where the votes of different stakeholders have different weights (e.g., the vote of the owner of the virtual world may be given more weight than the votes of other stakeholders).

The data received at step 577 may also indicate the default communication method for sending messages about the new or existing rule to the stakeholders of the virtual world (e.g., via email or a display or pop-up notification on user devices).

At step 578, a virtual world object (e.g., the virtual world object 420) associated with the virtual world may be identified from the one or more blockchain networks by using the identifier (e.g., virtual world object identifier) for the virtual world object (e.g., virtual world object 420) received at step 577 as an address for the virtual world object in the one or more blockchain networks.

At step 579, stakeholders of the virtual world may be determined from the virtual world object identified at step 578. A virtual world object (e.g., the virtual world object 420) associated with the virtual world may store the contact information of the stakeholders of the virtual world (e.g., the contact information of the stakeholders 430), and such contact information may be retrieved from the virtual world object. Also, or alternatively, a virtual world object may store identifiers (e.g., the user account object identifiers 441) for user account objects (e.g., user account objects 440) associated with the stakeholders, and such identifiers may be retrieved from the virtual world object.

Data received at step 577 may indicate that each stakeholder of the virtual world may only have the opportunity to vote once, and the contact information of the stakeholders stored in the virtual world object may be compared to remove duplicate entries for a shareholder. For example, two or more entries may be present in the virtual world object (e.g., in the contact information of the stakeholders 430) for a stakeholder with the name "John Smith" and the residential address "123 Board St, Washington, DC" but the entries may include different email addresses. Only one entry or email address may be considered when sending a message to the stakeholder about the new or existing rule.

Also, or alternatively, the data received at step 577 may indicate that each stakeholder of the virtual world may only have the opportunity to vote once, and the identifiers for the user account objects associated with the stakeholders of the virtual world may be retrieved from the virtual world object. A stakeholder may be associated with multiple user account objects for accessing the virtual world. In such cases, the user account objects may be used to identify a single reputation account object associated with each stakeholder (e.g., identified by the identifier for reputation account object 443 in the user account objects). Contact information for the stakeholder stored in the identified reputation account objects (e.g., in the database 468 for storing contact information) may be used for sending messages to the stakeholders about the new or existing rule.

At step 580, messages may be sent to the stakeholders based on the contact information retrieved from the virtual world object at step 579. The messages may comprise an identifier associated with the new rule to be added and/or the existing rule to be modified or removed, the new or existing rule, and/or a request to the stakeholders to vote regarding the new rule to be added to the rulebooks and/or for modification or removal of an existing rule (e.g., to vote for or against adding the new rule and/or to vote for or against modifying or removing the existing rule).

At step 581, one or more blockchain transactions may be identified by traversing the blocks (e.g., blocks 400A-D) of the one or more blockchain networks recording votes cast by the stakeholders for the new or existing rule. FIG. 8F shows an example blockchain transaction 870 comprising a voting element 871 and a hash 878. The voting element 871 may comprise a vote 872 cast at the time and date indicated in the timestamp 806 for a rule identified by the rule identifier 876. The voting element 871 may also comprise a stakeholder identifier 874 for the stakeholder that executed the blockchain transactions with the vote 872. The blockchain transaction 870 may be identified as comprising a vote for the rule received at step 877 based on the blockchain transaction 870 including the rule identifier 876 for the rule.

The blockchain transaction 870 may include a hash 878 that may be a digital signature of the voting element 971. The user device associated with the stakeholder (e.g., the stakeholder associated with the stakeholder identified 874) may generate a unique hash 878 for the contents of the voting element 971 and encrypt the hash 878 by using encryption keys (e.g., private keys, symmetric keys) associated with the user device and/or the stakeholder. Various hashing algorithms may be used, such as MD-5, RIPEMD-160, SHA, Whirlpool, and/or other hashing algorithms. The blockchain transaction 870 may indicate the type of hashing algorithm used to generate the hash 878, or a standard hashing algorithm may be used by the reputation management server 300 and/or the user or stakeholder devices interacting with the reputation management server. After identifying the blockchain transaction 870, encryption keys (e.g., public keys) of the user device and/or the stakeholder may be used to decrypt the encrypted hash 878. The hashing algorithm indicated by the blockchain transaction 870 or a standard hashing algorithm may be used to generate another hash of the voting element 871. The newly generated hash of the voting element and the decrypted hash 878 may be compared, and if the two hashes match, the vote 872 may be verified. If the hashes do not match, then the vote may be considered as being invalid.

At step 582, it may be determined whether the identified votes satisfy the requirement of updating the rulebook of the virtual world by adding the new rule and/or for removal or modification of the existing rule. The votes considered at step 582 may be the valid votes (e.g., votes with matching hashes) identified at step 581. The requirement may comprise having a predetermined percentage (e.g., more than 50%, more than 66%, etc.) of votes for updating the rulebook by adding the new rule and/or removing or modifying the existing rule. Alternatively, the requirement may comprise having a minimum percentage of votes indicated by the data of step 577. The requirements may be satisfied by calculating a score from the identified votes where the votes of different stakeholders have different weights (e.g., the vote of the owner of the virtual world is given more weight than the votes of other stakeholders), and the calculated score being higher than a threshold score received at step 577.

If the identified votes do not satisfy the requirements, step 501 of FIG. 5A may be performed again. If the identified votes satisfy the requirements, at step 583, the virtual world object may be modified to add the new rule to the rulebooks and/or to modify or remove the existing rule. At step 584, the updated rulebook may be sent to the prohibited activity evaluators of class type A and/or class type B.

Figure 9:
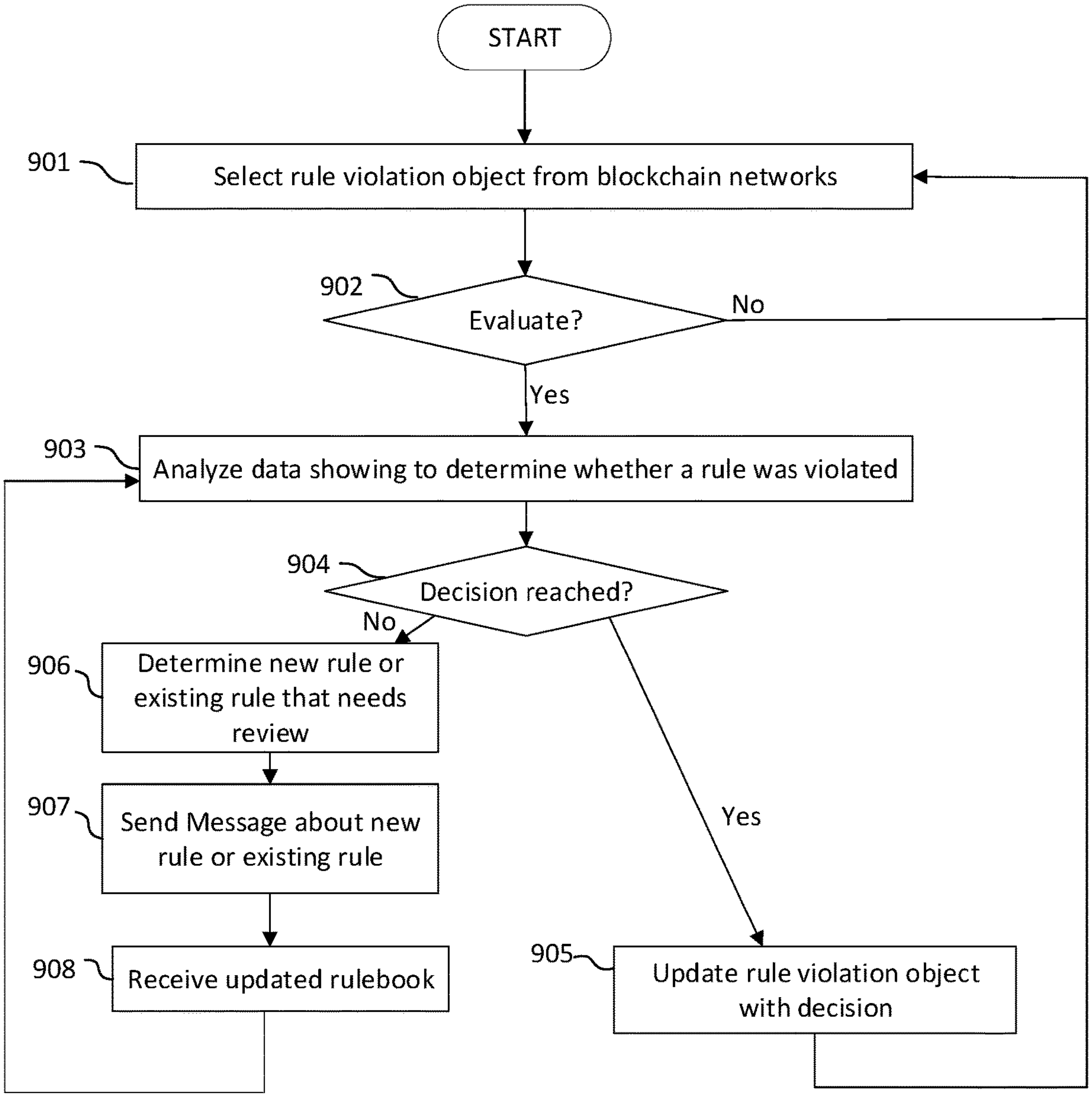
FIG. 9 shows a flow chart showing steps of an example method for evaluating prohibited activities.

FIG. 9 shows a flow chart showing steps of an example method for evaluating data about user activities stored in rule violation objects (e.g., rule violation objects 480) and determining whether any of the user activities are prohibited. The steps of FIG. 9 may be performed by a prohibited activity evaluator associated with a prohibited activity evaluator object (e.g., the prohibited activity object 470) stored in one or more blockchain networks. The prohibited activity evaluators may be user devices and/or nodes of one or more blockchain networks designated as prohibited activity evaluators of class type A or class type B. Prohibited activity evaluators of class type A or class type B may comprise machine learning-based models, such as natural language processing, regression-based models, neural network-based models, and/or fully-connected network-based models. The machine learning models may be trained on rulebooks (e.g., the general rulebook for prohibited activities 423, the location-based rulebook for prohibited activities 424, and/or rulebooks stored in the virtual world object 420) of one or more virtual worlds to analyze data associated with user activities in the virtual worlds and to determine whether any portion of the data indicates a user performing an activity prohibited by the rules in the rulebooks. Such data may comprise video, audio, graphics, pictures, text, and/or other data. One, some, or all steps of the method in FIG. 9 may also or alternatively be performed by one or more other computing devices (e.g., a computing device other than a user device or a node of a blockchain network). One, some, or all of the steps may be rearranged or otherwise modified. Steps may be omitted and/or other steps added.

At step 901, a rule violation object (e.g., the rule violation object 480) may be selected from data stored in one or more blockchain networks. The rule violation object may be selected based on a status (e.g., the status 482) indicating that the rule violation objects need review by a prohibited activity evaluator of class type A or class type B. A prohibited activity evaluator of class type A may only select a rule violation object comprising a status indicating that the rule violation object needs review by a prohibited activity evaluator of class type A. However, a prohibited activity evaluator of class type B may select a rule violation object comprising a status indicating that the rule violation object needs review by a prohibited activity evaluator of either class type A or class type B.

At step 902, it may be determined whether the selected rule violation object of step 901 will be evaluated. For example, a prohibited activity evaluator may determine that user activities (e.g., data stored as evidence data 487) were performed in a virtual world for which the prohibited activity evaluator does not have proper certifications and select not to evaluate the selected rule violation object of step 901. As another example, the prohibited activity evaluator may determine that the data stored in the selected rule violation object (e.g., data stored as evidence data 487) comprises a five-hour long video and select not to evaluate the selected rule violation object. Alternatively, the prohibited activity evaluator may determine that the user (e.g., identified by the user account object identifier for violating user) that performed the user activities (e.g., data stored as evidence data 487) is located in a country different than the country the prohibited activity evaluator is located and select not to evaluate the selected rule violation object. If it is determined that the selected rule violation object will not be evaluated, the selected rule violation object may be updated to show that the prohibited activity evaluator decided not to evaluate the rule violation object (e.g., update date stored in the decision and prohibited activity evaluator data 488 to indicate that the prohibited activity evaluator selected not to perform the evaluation), and step 901 may be performed.

If it is determined at step 902 that the selected rule violation object of step 901 will be evaluated, at step 903, data stored in the selected rule violation object (e.g., data stored as evidence data 487 in the selected rule violation object) may be analyzed to determine whether the data indicates any activity that would violate one or more rules of a rulebook (e.g., the general rulebook for prohibited activities 423, the location-based rulebook for prohibited activities 424, and/or other rulebooks stored in the virtual world object 420) of a virtual world associated with a virtual world object identifier included in the rule violation object (e.g., the virtual world object identifier 485). The rulebook may be retrieved from one or more blockchains by using the included virtual world object identifier as an address for the virtual world object (e.g., virtual world object 420). Data (e.g., evidence data 487) stored in the selected rule violation object may be analyzed by machine learning models trained on the rules in the rulebook. For example, the data may comprise video (e.g., two-dimensional or three-dimensional) of a user performing activities in a virtual world, and the machine learning models may analyze the video frames to determine what activity an avatar associated with the user is performing and whether the activity is prohibited based on the rules in the rulebook. The machine learning-based models may be configured to determine the classes of the objects in the video (e.g., avatar associated with the user, avatars of other users, virtual properties, weapons, animals, and/or other objects) and identify specific events or behaviors in the video streams, such as an avatar attacking another avatar. Additionally, machine learning-based models may analyze posted photos and/or texts to determine if any prohibited activity has been performed (e.g., spreading false information, showing copyright photos, altering photos to spread false information, etc.).

At step 904, it may be determined whether any decision is reached regarding the activities of the user analyzed at step 903. The decision may be that a prohibited activity based on the rulebooks of the virtual world was performed. Alternatively, the decision may be that a prohibited activity was not performed. If a decision is reached, at step 905, the rule violation object of step 901 is updated with a decision (e.g., stored in the decision and prohibited activity evaluator data 488), indicating whether the user activities data in the rule violation object show any prohibited activity or not. If any of the activities are prohibited, then a penalty value for the prohibited activity may also be recorded in the rule violation object (e.g., stored in the decision and prohibited activity evaluator data 488). In some examples, the penalty may be to ban the user from accessing the virtual world, and that decision may also be recorded in the rule violation object (e.g., stored in the decision and prohibited activity evaluator data 488). Afterward, step 901 may be performed.

If a decision is not reached at step 904, a new rule needed to address the user activities stored in the rule violation object may be determined at step 906. Alternatively, an existing rule that may need to be modified to address the user activities stored in the rule violation object may be determined at step 906, or it may be determined that an existing rule needs to be canceled. For example, data in the selected rule violation object may indicate an avatar of a user destroying the virtual properties of other players of the massively multiplayer online game, and destroying virtual properties may be a prohibited activity according to the rulebook of the massively multiplayer online game. However, the data may also indicate that the virtual properties were destroyed because the avatar of the user was running away from another avatar attacking the avatar of the user and destroying the virtual properties while escaping. The rule about destroying virtual property may be modified to add an exception that destroying virtual properties while trying to escape from being attacked is not a prohibited activity, and/or a new rule about escaping may be a good candidate rule for adding to the rulebook of the massively multiplayer online game. It may also be determined that a rule may need to be canceled (e.g., rules about not being able to buy non-fungible tokens from a particular country). At step 907, a message may be sent about the new or existing rule to a the reputation management server 300 to initiate the voting process for the new or existing rule at step 907. At step 908, an updated rulebook may be received where the updated rulebook may comprise the new rules that have been voted by the stakeholders of the virtual world to be added to the rulebook. Alternatively, the updated rulebook may comprise a modified existing rule, or an existing rule may be removed from the rulebook. Afterward, step 903 may be performed again where the data stored in the selected rule violation object (e.g., data stored as evidence data 487 in the selected rule violation object) may be analyzed to determine whether the data indicates any activity that would violate one or more rules of the updated rulebook received at step 908.

Figure 10:
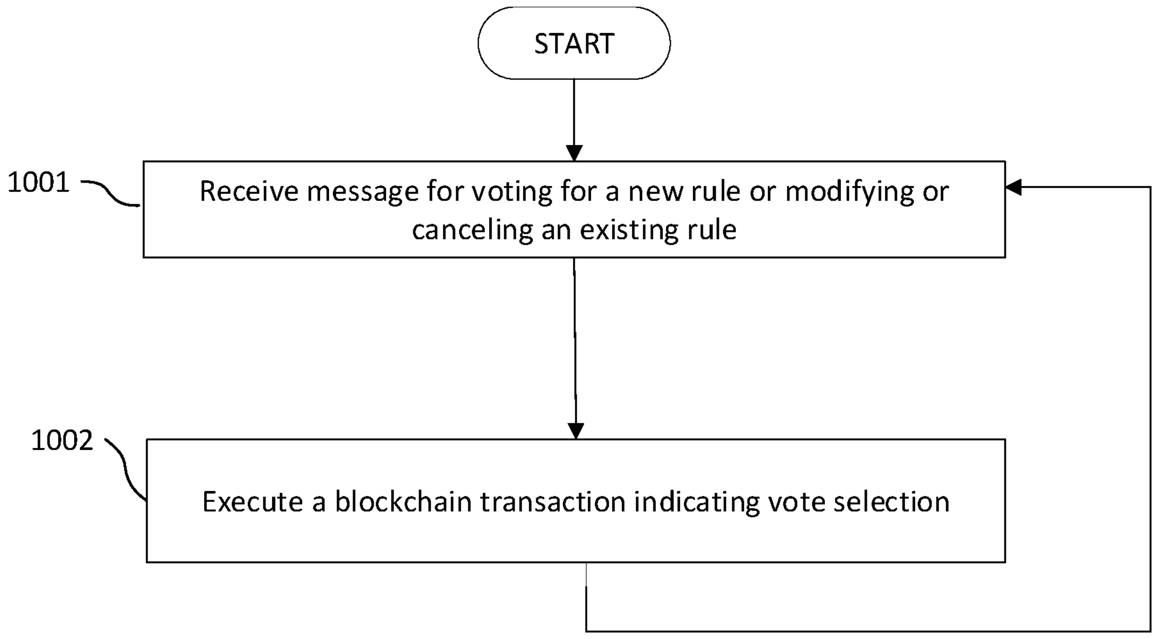
FIG. 10 shows a flow chart showing steps of an example voting method for rules of the virtual worlds.

FIG. 10 shows a flow chart showing steps of an example voting method for a stakeholder of a virtual world. The stakeholder may vote via a stakeholder device (e.g., a device from the premises 102, a mobile device 125, a node from the internal blockchain network 134 or the external blockchain networks 138, or another computing device) and/or a node of a blockchain network). One, some, or all steps of the method in FIG. 10 may also or alternatively be performed by one or more other computing devices (e.g., a computing device other than a user device or a node of a blockchain network). One, some, or all of the steps may be rearranged or otherwise modified. Steps may be omitted and/or other steps added.

At step 1001, a message may be received about a new rule to be added to a rulebook (e.g., the rulebook for access 425, the general rulebook for prohibited activities 423, the location-based rulebook for prohibited activities 424, and/or other rulebooks stored in the virtual world object 420), or an existing rule to be modified or canceled. The message may include a rule identifier for the new rule or existing rule. The stakeholder device may output the message via one or more display screens. The display screens may request a user of the stakeholder device to vote yes or no to the rule or existing rule or decline to vote. Based on the selection, at step 1002, the stakeholder device may execute a blockchain transaction (e.g., the blockchain transaction 870) comprising the vote (e.g., the vote 872), an identifier associated with the stakeholder (e.g., the stakeholder identifier 874), and/or the rule identifier (e.g., the rule identifier 876). The blockchain transaction may be broadcasted to nodes of one or more blockchain networks. If the stakeholder device does not receive a selection from the user of the stakeholder device within a time period (e.g., a day, a week, etc.), the stakeholder device may execute a blockchain transaction comprising an indication that the user has not voted.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:

receiving, by one or more computing devices and from a user associated with a user device, a first request to access a virtual world;

executing, by the one or more computing devices, with one or more blockchain networks, and based on the first request, a blockchain transaction indicating granted access to the virtual world, wherein the blockchain transaction comprises a first timestamp indicating when the user has started interactions with the virtual world;

determining, based on a second blockchain transaction, a second timestamp indicating when the user ceased accessing the virtual world; and based on data, from the one or more blockchain networks, indicating that the user has violated, after the first timestamp and before the second timestamp, a predetermined rule from one or more rulebooks associated with prohibited activities in the virtual world:

executing a fourth blockchain transaction to reduce a quantity of reputation tokens by a penalty value; and denying a second request from the user to access the virtual world, wherein the data was generated based on processing, using a machine learning model, text provided by the user when participating in the virtual world.

2. The method of claim 1, wherein the text corresponds to a message, by the user, to one or more other users.

3. The method of claim 1, wherein the one or more rulebooks associated with prohibited activities in the virtual world are stored in the one or more blockchain networks.

4. The method of claim 1, further comprising:

receiving, after executing the fourth blockchain transaction, the second request from the user to access the virtual world, wherein the denying the second request is based on a determination that the reduced quantity of reputation tokens does not satisfy a threshold quantity of reputation tokens associated with access to the virtual world.

5. The method of claim 1, further comprising:

receiving, from a second user associated with a second user device, a second request to access the virtual world;

determining, based on second data from the one or more blockchain networks, a second quantity of reputation tokens associated with the second user; and granting, based on the second quantity of reputation tokens satisfying a threshold quantity of reputation tokens, the second request from the second user.

6. The method of claim 1, further comprising:

receiving, from a second user associated with a second user device, a second request to convert a portion of a second quantity of reputation tokens, associated with the second user, to tokens usable as digital currency or cryptocurrency;

executing, based on a determination that the second quantity of reputation tokens satisfies a second threshold quantity of reputation tokens required for converting the portion of the second quantity of reputation tokens, a third blockchain transaction to reduce the second quantity of reputation tokens;

receiving, from the second user, a third request to access the virtual world; and based on the reduced second quantity of reputation tokens satisfying a threshold quantity of reputation tokens, granting, to the second user device and via the second user device, access to the virtual world.

7. The method of claim 1, wherein the machine learning model comprises a natural language processing model configured to identify false information.

8. One or more non-transitory computer-readable media storing instructions that, when executed, cause:

receiving, by one or more computing devices and from a user associated with a user device, a first request to access a virtual world;

executing, by the one or more computing devices, with one or more blockchain networks, and based on the first request, a blockchain transaction indicating granted access to the virtual world, wherein the blockchain transaction comprises a first timestamp indicating when the user has started interactions with the virtual world;

determining, based on a second blockchain transaction, a second timestamp indicating when the user ceased accessing the virtual world; and based on data, from the one or more blockchain networks, indicating that the user has violated, after the first timestamp and before the second timestamp, a predetermined rule from one or more rulebooks associated with prohibited activities in the virtual world:

executing a fourth blockchain transaction to reduce a quantity of reputation tokens by a penalty value; and denying a second request from the user to access the virtual world, wherein the data was generated based on processing, using a machine learning model, text provided by the user when participating in the virtual world.

9. The one or more non-transitory computer-readable media of claim 8, wherein the text corresponds to a message, by the user, to one or more other users.

10. The one or more non-transitory computer-readable media of claim 8, wherein the one or more rulebooks associated with prohibited activities in the virtual world are stored in the one or more blockchain networks.

11. The one or more non-transitory computer-readable media of claim 8, wherein the virtual world comprises a computer-simulated environment enabling interactions between the user and other users.

12. The one or more non-transitory computer-readable media of claim 8, wherein the instructions, when executed, further cause:

receiving, from a second user associated with a second user device, a second request to access the virtual world;

determining, based on second data from the one or more blockchain networks, a second quantity of reputation tokens associated with the second user; and granting, based on the second quantity of reputation tokens satisfying a threshold quantity of reputation tokens, the second request from the second user.

13. The one or more non-transitory computer-readable media of claim 8, wherein the instructions, when executed, further cause:

receiving, from a second user associated with a second user device, a second request to convert a portion of a second quantity of reputation tokens, associated with the second user, to tokens usable as digital currency or cryptocurrency;

executing, based on a determination that the second quantity of reputation tokens satisfies a second threshold quantity of reputation tokens required for converting the portion of the second quantity of reputation tokens, a third blockchain transaction to reduce the second quantity of reputation tokens;

receiving, from the second user, a third request to access the virtual world; and based on the reduced second quantity of reputation tokens satisfying a threshold quantity of reputation tokens, granting, to the second user and via the second user device, access to the virtual world.

14. The one or more non-transitory computer-readable media of claim 8, wherein the machine learning model comprises a natural language processing model configured to identify false information.

15. A computing device comprising:

one or more processors; and memory storing instructions that, when executed by the one or more processors, cause the computing device to:

receive, from a user associated with a user device, a first request to access a virtual world;

execute, with one or more blockchain networks and based on the first request, a blockchain transaction indicating granted access to the virtual world, wherein the blockchain transaction comprises a first timestamp indicating when the user has started interactions with the virtual world;

determine, based on a second blockchain transaction, a second timestamp indicating when the user ceased accessing the virtual world; and based on data, from the one or more blockchain networks, indicating that the user has violated, after the first timestamp and before the second timestamp, a predetermined rule from one or more rulebooks associated with prohibited activities in the virtual world:

execute a fourth blockchain transaction to reduce a quantity of reputation tokens by a penalty value; and deny a second request from the user to access the virtual world, wherein the data was generated based on processing, using a machine learning model, text provided by the user when participating in the virtual world.

16. The computing device of claim 15, wherein the text corresponds to a message, by the user, to one or more other users.

17. The computing device of claim 15, wherein the one or more rulebooks associated with prohibited activities in the virtual world are stored in the one or more blockchain networks.

18. The computing device of claim 15, wherein the virtual world comprises a computer-simulated environment enabling interactions between the user and other users.

19. The computing device of claim 15, wherein the instructions, when executed by the one or more processors, further cause the computing device to:

receive, from a second user associated with a second user device, a second request to access the virtual world;

determine, based on second data from the one or more blockchain networks, a second quantity of reputation tokens associated with the second user; and grant, based on the second quantity of reputation tokens satisfying a threshold quantity of reputation tokens, the second request from the second user.

20. The computing device of claim 15, wherein the instructions, when executed by the one or more processors, further cause the computing device to:

receive, from a second user associated with a second user device, a second request to convert a portion of a second quantity of reputation tokens, associated with the second user, to tokens usable as digital currency or cryptocurrency;

execute, based on a determination that the second quantity of reputation tokens satisfies a second threshold quantity of reputation tokens required for converting the portion of the second quantity of reputation tokens, a third blockchain transaction to reduce the second quantity of reputation tokens;

receive, from the second user, a third request to access the virtual world; and based on the reduced second quantity of reputation tokens satisfying a threshold quantity of reputation tokens, grant, to the second user and via the second user device, access to the virtual world.

21. The computing device of claim 15, wherein the machine learning model comprises a natural language processing model configured to identify false information.

* * * * *